(12) United States Patent
Dehmeshki

(10) Patent No.: US 7,574,031 B2
(45) Date of Patent: Aug. 11, 2009

(54) NODULE BOUNDARY DETECTION

(75) Inventor: Jamshid Dehmeshki, London (GB)

(73) Assignee: Medicsight PLC, London (GB)

( * ) Notice: Subject to any disclaimer, the term of this patent is extended or adjusted under 35 U.S.C. 154(b) by 1037 days.

(21) Appl. No.: 10/868,890

(22) Filed: Jun. 17, 2004

(65) Prior Publication Data

US 2005/0259855 A1 Nov. 24, 2005

(30) Foreign Application Priority Data

May 18, 2004 (GB) .............................. 0411064.9

(51) Int. Cl.
*G06K 9/00* (2006.01)
*A61B 6/00* (2006.01)
(52) U.S. Cl. .................... 382/131; 382/171; 378/23
(58) Field of Classification Search ........... 382/100, 382/128, 129, 130, 131, 132, 133, 134, 154, 382/168, 172–173, 180, 181, 191–203, 209, 382/220, 232, 255, 274–276, 285–294, 305, 382/319; 378/4, 21, 23
See application file for complete search history.

(56) References Cited

U.S. PATENT DOCUMENTS

| | | | |
|---|---|---|---|
| 4,907,156 A | 3/1990 | Doi et al. | |
| 6,088,743 A | 7/2000 | Takeda | |
| 6,091,841 A | 7/2000 | Rogers et al. | |
| 6,112,112 A | 8/2000 | Gilhuijs et al. | |
| 6,609,021 B1 | 8/2003 | Fan et al. | |
| 6,654,728 B1 | 11/2003 | Li et al. | |
| 6,813,375 B2 * | 11/2004 | Armato, III et al. | 382/131 |
| 6,882,743 B2 | 4/2005 | Bansal et al. | |
| 6,898,303 B2 * | 5/2005 | Armato et al. | 382/131 |

(Continued)

FOREIGN PATENT DOCUMENTS

WO   WO 99/42950   8/1999

(Continued)

OTHER PUBLICATIONS

Great Britian Search Report from Great Britain Appl. No. GB0411064.9, completed Oct. 21, 2004, 1 page.

(Continued)

*Primary Examiner*—Seyed Azarian
(74) *Attorney, Agent, or Firm*—Sterne, Kessler, Goldstein & Fox, PLLC.

(57) ABSTRACT

A method of detecting the extent of a lung nodule in a scan image comprises fine segmenting (14) a region around the nodule into foreground and background, filling holes within foreground areas (16), region growing the foreground (18) to identify an initial region of interest, determining a mask (20) by enlarging the initial region to contain background and to exclude other foreground regions, determining a spatial map (26) of connectivity within the mask to a point within the initial region, region growing (28) within the mask and determining the maximum edge contrast (30) during region growing. The region of maximum edge contrast identifies the extent of the nodule (32). The position of the nodule may a seed point identified by the user (12). Most preferably, an optimum seed point is determined by iterative determination of seed points (22, 24) so that the determined extent of the nodule is substantially independent of the precise location of the seed point identified by the user.

56 Claims, 28 Drawing Sheets

U.S. PATENT DOCUMENTS

| | | | |
|---|---|---|---|
| 6,909,797 B2 * | 6/2005 | Romsdahl et al. | 382/131 |
| 7,333,646 B2 * | 2/2008 | Cathier et al. | 382/128 |
| 7,336,809 B2 * | 2/2008 | Zeng et al. | 382/128 |
| 2003/0194119 A1 | 10/2003 | Manjeshwar et al. | |

FOREIGN PATENT DOCUMENTS

| | | |
|---|---|---|
| WO | WO 01/54066 A1 | 7/2001 |
| WO | WO 02/085211 | 10/2002 |
| WO | WO 03/046831 | 6/2003 |
| WO | WO 2004/081874 | 9/2004 |

OTHER PUBLICATIONS

Goo, J. et al., "Automated Lung Nodule Detection at Low-Dose CT: Preliminary Experience," *Korean J. Radiol.* 4(4):211-216, The Korean Radiological Society, Seoul, Korea (Dec. 2003).

Wiemker, R. et al., "Computer-aided detection (CAD) and volumetry of pulmonary nodules on high-resolution CT data," *MedicaMundi* 47(3):37-44, Royal Philips Electronics N.V., Eindhoven, The Netherlands (Nov. 2003).

Dellepiane et al. "Extraction of Intensity Connectedness for Image Processing", Pattern Recognition Letters, (16) Mar. 1995, No. 3, pp. 1-12.

Yao, J. et al., "Automatic Segmentation of Colonic Polyps in CT Colonography Based on Knowledge-Guided Deformable Models," *Medical Imaging 2003: Physiology and Function: Methods, Systems and Applications—Proceedings of SPIE* 5031:370-380, eds. Anne V. Clough and Amir A. Amini, The International Society for Optical Engineering, Bellingham, Washington, USA (May 2003).

Carvalho, B. et al., "Algorithms for Fuzzy Segmentation," *Pattern Analysis & Applications* 2(1):73-81, Springer London (Apr. 1999).

Gonzalez, R. and Woods, R., "Digital Image Processing," $2^{nd}$ Edition, Prentice-Hall, Inc., Upper Saddle River, New Jersey, pp. 567-642 (Jan. 15, 2002).

Nyúl, L.G. et al., "Fuzzy-connected 3D image segmentation at interactive speeds," *Medical Imaging 2000: Image Processing—Proceedings of SPIE* 3979:212-223, ed. Kenneth M. Hanson, The International Society for Optical Engineering, Bellingham, Washington, USA (Jun. 2000).

Hojjatoleslami, S.A. and Kittler, J., "Region Growing: A New Approach", *IEEE Transactions on Image Processing*, 7(7):1079-1084, IEEE, New York, New York (Jul. 1998).

Udupa, J. and Samarasekera, S., "Fuzzy Connectedness and Object Definition: Theory, Algorithms, and Applications in Image Segmentation," *Graphics Models and Image Processing* 58(3):246-261, Academic Press, Inc., (1996).

International Search Report for Appl. No. PCT/GB2005/001839, issued Dec. 8, 2005, 19 pages.

International Preliminary Report on Patentability, cited in International Application No. PCT/GB2005/001839 on Nov. 30, 2006, 10 pages.

* cited by examiner (a)

(b)

(c)

NODULE BOUNDARY DETECTION

RELATED APPLICATIONS

This application claims the benefit of the filing date of GB Patent Application No. 0411064.9, filed May 18, 2004, which is incorporated herein by reference in its entirety.

FIELD OF THE INVENTION

The present invention relates to a method of detecting the boundary of a nodule in an image previously scanned from a human or animal body, particularly but not exclusively in a computed tomography (CT) image of the lung, and more particularly but not exclusively to detecting the boundary of a lung nodule in a low-contrast area, such as attached to a blood vessel or in an isolated position within the lung. The method may be implemented using a computer, and the invention encompasses software and apparatus for carrying out the method.

BACKGROUND OF THE INVENTION

The mortality rate for lung cancer is higher than that for other kinds of cancers around the world. Detection of suspicious lesions in the early stages of cancer can be considered the most effective way to improve survival. Lung nodule detection is one of the more challenging tasks in medical imaging. Lung nodules may be difficult to detect on CT scans because of low contrast, small size, or location of the nodule within an area of complicated anatomy. In particular, it is difficult to detect the extent of a lung nodule purely by inspection, when the nodule is attached to a blood vessel or vessels or surrounded by structure with a similar intensity to the nodule. Detection of the size or extent of a lung nodule is important for accurate diagnosis.

One problem with known techniques is a tendency to include part of a blood vessel with the detected nodule, because of an inability to distinguish between the two.

Another problem with known techniques is that they are over-reliant on the setting of detection parameters by the operator, and there are no ideal parameter values which are applicable to all scan images.

Another problem with known techniques is that they impose a model which is not applicable for all types of lung nodule.

U.S. Pat. No. 4,907,156 discloses a method of detecting lung nodules by pixel thresholding, followed by circularity and/or size testing of contiguous pixels above the threshold.

WO-A-9942950 discloses a method of lung nodule detection involving pre-processing the image to identify candidate nodules, performing image enhancement on a candidate nodule, and identifying whether the candidate nodule is a false positive by obtaining a histogram of accumulated edge gradients as a function of radial angle.

WO-A-02085211 discloses a method of automatic lung nodule detection using adaptive threshold segmentation.

U.S. Pat. No. 6,654,728 discloses a method of discriminating nodules in a chest scan images using fuzzy logic classification.

WO-A-0346831 discloses a computerized lung nodule detection method which creates a mask image by linear interpolation between first and last CT section images, warped to match intermediate CT section images.

The article 'Automated Lung Nodule Detection at Low-Dose CT: Preliminary Experience' by Goo JM et. al., Korean J Radiol 4(4), December 2003 discloses a technique for detecting lung nodules using grey-level thresholding and 3D region growing, together with 3D shape analysis to distinguish nodules from blood vessels.

SUMMARY OF THE INVENTION

According to an embodiment of the present invention, there is provided a method of detecting the boundary or extent of a lung nodule in a scan image, comprising: identifying the location of the nodule by obtaining a seed point within the nodule; fine segmenting the region of interest into foreground and background; region growing a nodule foreground area from the seed point; determining a mask by enlarging the nodule foreground to contain background surrounding the nodule foreground area and to exclude other foreground not connected to the nodule foreground; determining a connectivity map of the strength of connectivity of each point within the mask to the seed point, and applying a connectivity criterion to detect the boundary or extent of the lung nodule.

Preferably, the fine segmentation is based on local contrast. One advantage of using local contrast is that a boundary can be detected between adjacent objects of similar intensity, such as a nodule and a blood vessel. In this case, the fine segmentation can establish a boundary of background between the foreground objects. Another advantage is that a low intensity object can be identified as foreground even if a high intensity object is also present in the scan image, but is not close enough to the low intensity object to raise the local segmentation threshold above the low intensity value and therefore cause the low intensity object to be identified as background.

Fine segmentation based on local contrast can lead to spurious detection of foreground objects in background areas of low, but variable intensity. Such variations in background intensity are often due to scanning artefacts such as shadows, or objects that are not likely to be nodules. Hence, detection of these spurious foreground objects is advantageous, because they are then excluded from the mask and do not affect subsequent processing steps.

Preferably, background 'holes' surrounded by foreground after the fine segmentation are converted to foreground. These background holes are typically a result of the fine segmentation within objects of high, but variable intensity and do not represent real low-intensity holes.

Preferably, the connectivity criterion is adaptively determined by region growing from the seed point in the connectivity map, without extending beyond the mask, and determining the maximum boundary contrast during region growing. The extent of the nodule is determined as the region boundary of maximum boundary contrast during region growing. This boundary represents the point at which the region is most disconnected from the background, and is therefore most likely to represent the boundary of the nodule. This technique is adaptive to the contrast of the nodule to its background, and does not require arbitrary thresholding of the connectivity map.

The region growing may be weighted according to the strength of connectivity in the connectivity map of each point neighboring the current region, so that neighboring points having higher connectivity are added to the region before neighboring points having lower connectivity. This improves the likelihood that the boundary at some stage during region growing corresponds to the actual boundary of the nodule.

The region growing may be weighted inversely to the distance of each point neighboring the current region from the centre of the current region, so that points closer to the centre are added to the region before points further from the centre.

This gives the region a tendency to sphericity, which is common to actual nodules, without imposing a rigid shape to the region.

Preferably, an optimum seed point is determined iteratively so that the mask, and therefore the detected boundary of the nodule is substantially independent of the precise location of an initial seed point, which serves only to identify the nodule of interest.

The detected extent or boundary can be displayed graphically, and/or any derived metric such as the size, shape, volume, mass or density of the nodule may be output.

The method can be applied to a single scan slice, but is preferably applied to a three-dimensional (3D) image constructed from a plurality of sequential slices.

DETAILED DESCRIPTION OF PREFERRED EMBODIMENTS

CT Image

Each embodiment is performed on series of CT image slices obtained from a CT scan of the chest area of a human or animal patient. Each slice is a 2-dimensional digital greyscale image of the x-ray absorption of the scanned area. The properties of the slice depend on the CT scanner used; for example, a high-resolution multi-slice CT scanner may produce images with a resolution of 0.5-0.6 mm/pixel in the x and y directions (i.e. in the plane of the slice). Each pixel may have 32-bit grayscale resolution. The intensity value of each pixel is normally expressed in Hounsfield units (HU). Sequential slices may be separated by a constant distance along the z direction (i.e. the scan separation axis); for example, by a distance of between 0.75-2.5 mm. Hence, the scan image is a three-dimensional (3D) grey scale image, with an overall size depending on the area and number of slices scanned.

The present invention is not restricted to any specific scanning technique, and is applicable to electron beam computed tomography (EBCT), multi-detector or spiral scans or any technique which produces as output a 2D or 3D image representing X-ray absorption.

Figure 1:
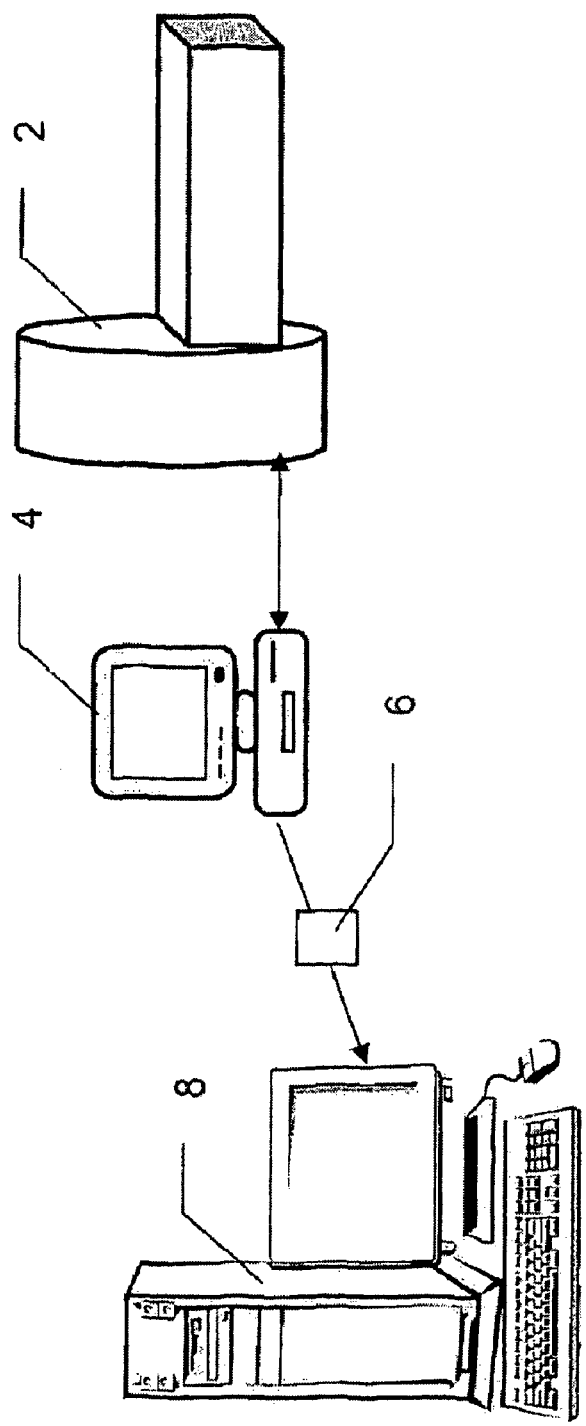
FIG. 1 is a schematic diagram showing a CT scanner and a remote computer for processing image data from the scanner.

As shown in FIG. 1, the scan image is created by a computer 4 which receives scan data from a scanner 2 and constructs the scan image. The scan image is saved as an electronic file or a series of files which are stored on a storage medium 6, such as a fixed or removable disc. The scan image may be processed by the computer 4 to identify the extent of a lung nodule, or the scan image may be transferred to another computer 8 which runs software for processing the image as described below. The image processing software may be stored on a carrier, such as a removable disc, or downloaded over a network.

Figure 1A:
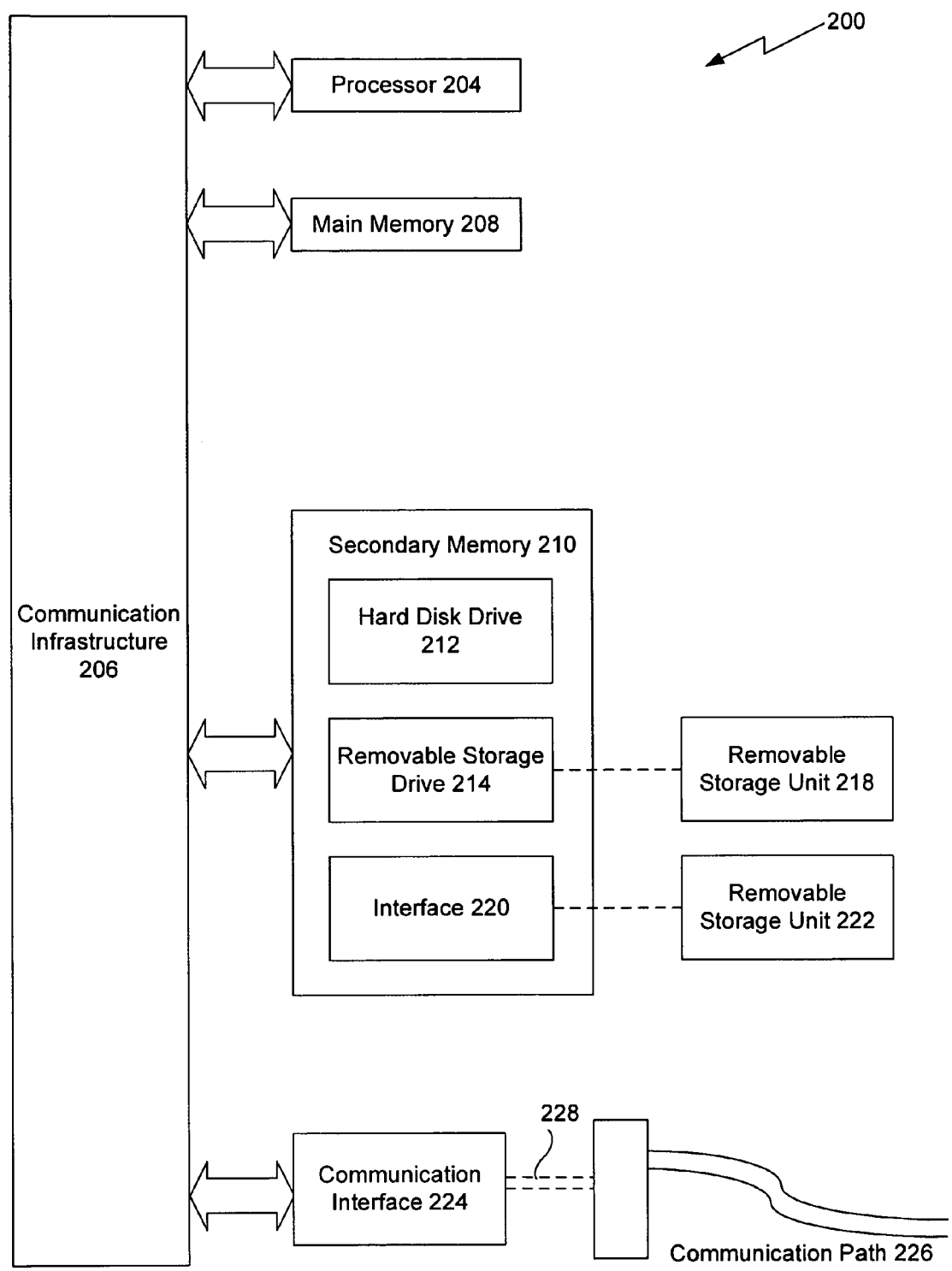
FIG. 1a is an example computer system according to an embodiment of the present invention.

FIG. 1a illustrates an example computer system 200, in which the present invention can be implemented as programmable code. Various embodiments of the invention are described in terms of this example computer system 200. After reading this description, it will become apparent to a person skilled in the art how to implement the invention using other computer systems and/or computer architectures.

The computer system 200 includes one or more processors, such as processor 204. Processor 204 can be a special purpose or a general purpose digital signal processor. The processor 204 is connected to a communication infrastructure 206 (for example, a bus or network). Various software implementations are described in terms of this exemplary computer system. After reading this description, it will become apparent to a person skilled in the art how to implement the invention using other computer systems and/or computer architectures.

Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218, represents a floppy disk, magnetic tape, optical disk, etc. which is read by and written to by removable storage drive 214. As will be appreciated, the removable storage unit 218 includes a computer usable storage medium having stored therein computer software and/or data.

In alternative implementations, secondary memory 210 may include other similar means for allowing computer programs or other instructions to be loaded into computer system 200. Such means may include, for example, a removable storage unit 222 and an interface 220. Examples of such means may include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to computer system 200.

Computer system 200 may also include a communication interface 224. Communication interface 224 allows software and data to be transferred between computer system 200 and external devices. Examples of communication interface 224 may include a modem, a network interface (such as an Ethernet card), a communication port, a Personal Computer Memory Card International Association (PCMCIA) slot and card, etc. Software and data transferred via communication interface 224 are in the form of signals 228 which may be electronic, electromagnetic, optical, or other signals capable of being received by communication interface 224. These signals 228 are provided to communication interface 224 via a communication path 226. Communication path 226 carries signals 228 and may be implemented using wire or cable, fiber optics, a phone line, a cellular phone link, a radio frequency link, or any other suitable communication channel. For instance, the communication path 226 may be implemented using a combination of channels.

In this document, the terms "computer program medium" and "computer usable medium" are used generally to refer to media such as removable storage drive 214, a hard disk installed in hard disk drive 212, and signals 228. These computer program products are means for providing software to computer system 200.

Computer programs (also called computer control logic) are stored in main memory 208 and/or secondary memory 210. Computer programs may also be received via communication interface 224. Such computer programs, when executed, enable the computer system 200 to implement the present invention as discussed herein. Accordingly, such computer programs represent controllers of the computer system 200. Where the invention is implemented using software, the software may be stored in a computer program product and loaded into computer system 200 using removable storage drive 214, hard disk drive 212, or communication interface 224, to provide some examples.

Detection of Pulmonary or Isolated Nodules

Figure 2:
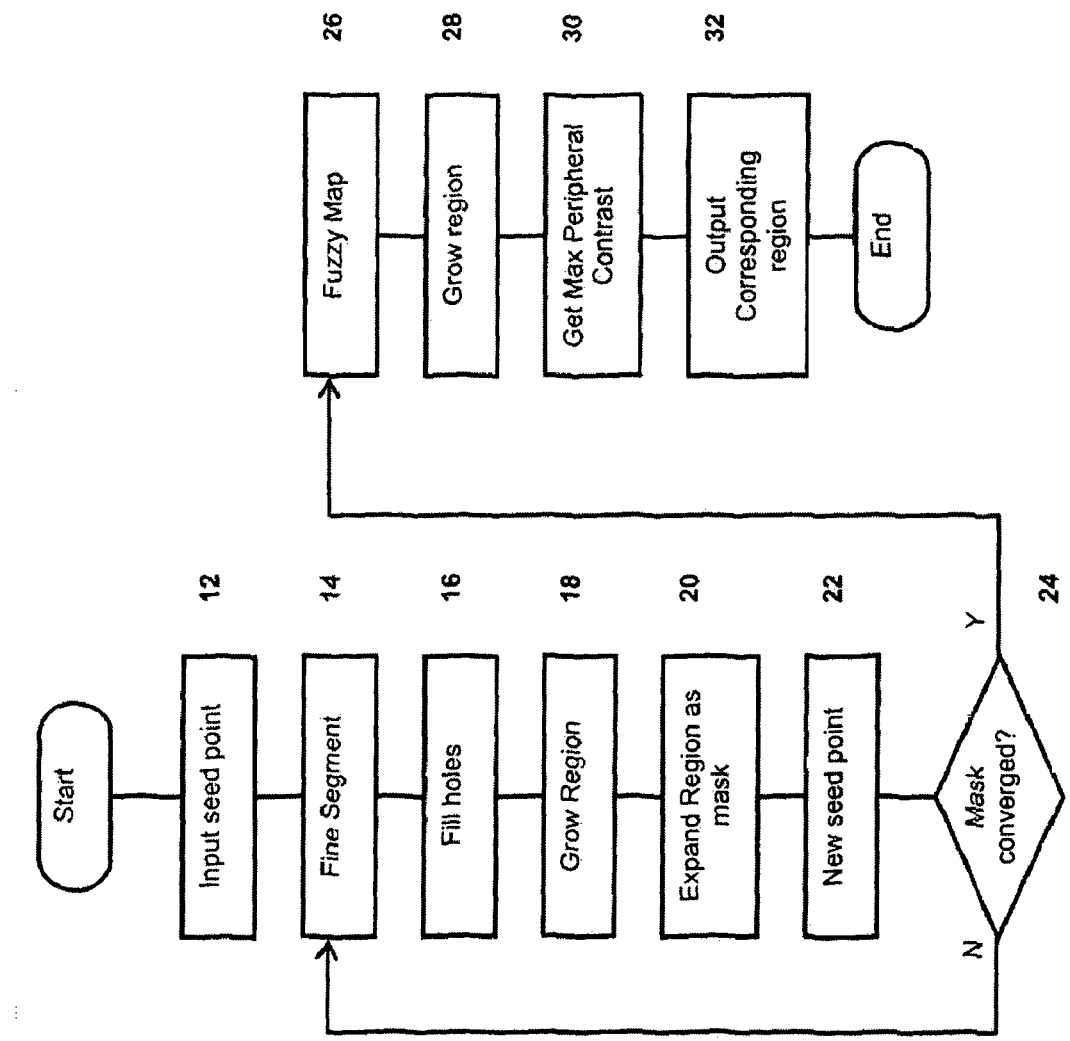
FIG. 2 is a flowchart of an algorithm according to an embodiment of the present invention.

An embodiment comprises image-processing software for detecting the extent of pulmonary nodules, which appear attached to one or more blood vessels within a CT image, or isolated nodules, which are not adjacent to any other feature in the CT image. This embodiment uses a fuzzy/contrast region-growing scheme as described below. A flowchart of the algorithm is shown in FIG. 2, and references to step numbers in the description below are to steps in this flowchart.

Figure 3:
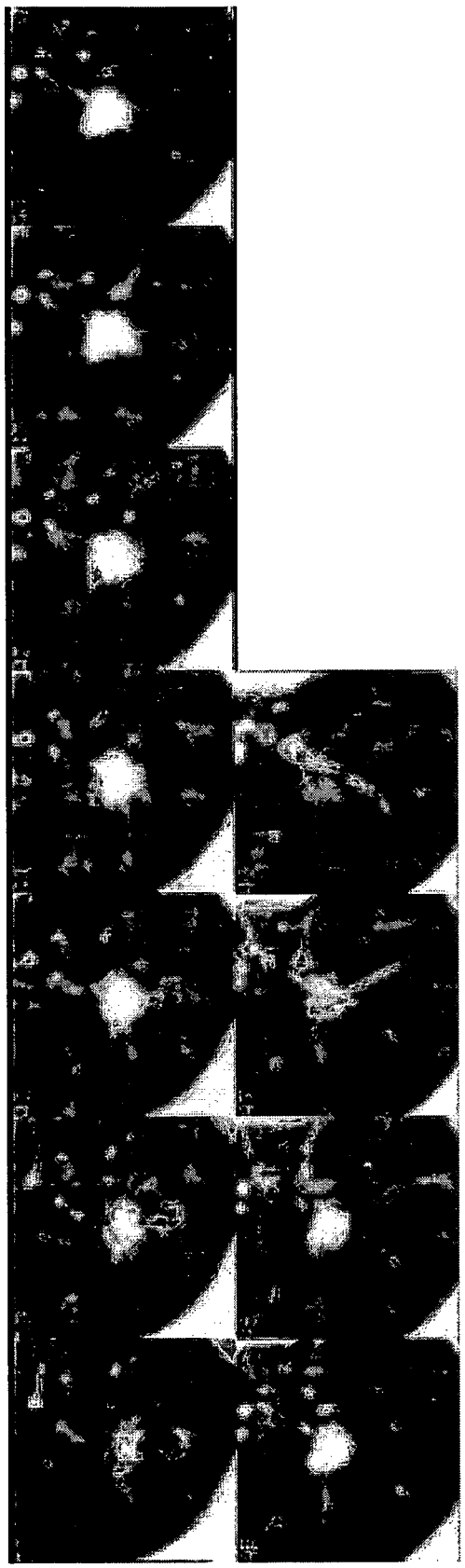
FIG. 3 shows a series of slices of a CT scan image.
Figure 7:
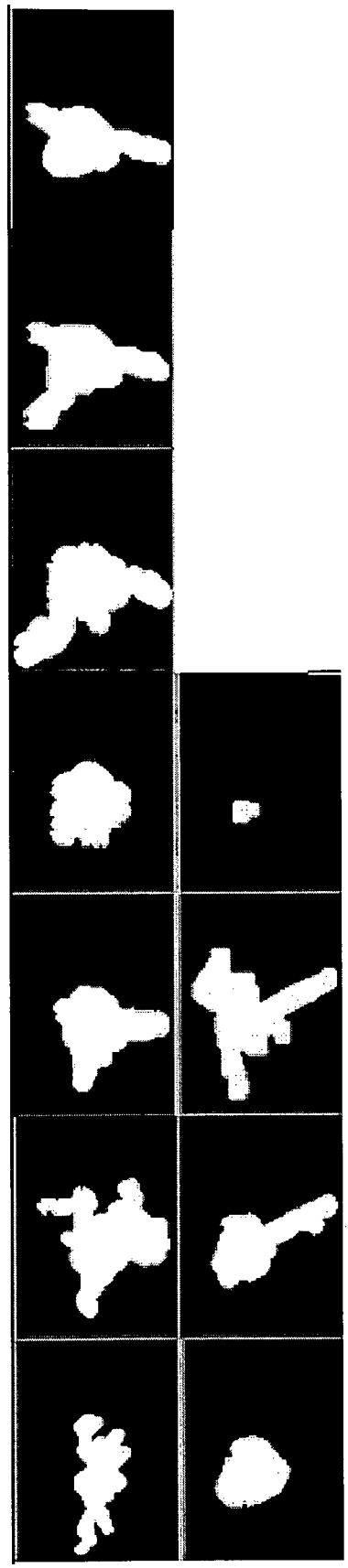
FIG. 7 shows an enlarged initial region used as a mask area.
Figure 8:
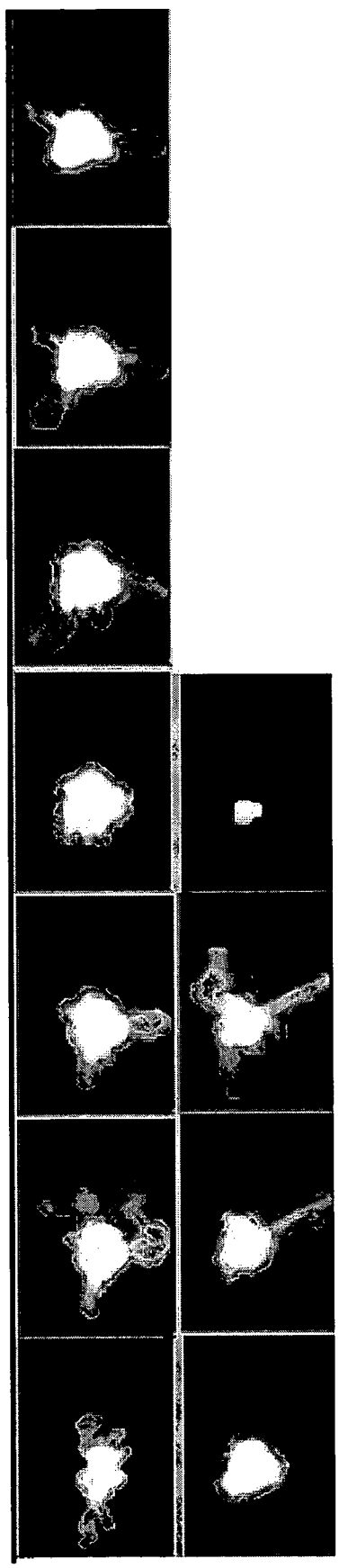
FIG. 8 shows a fuzzy map within the mask area.
Figure 9:
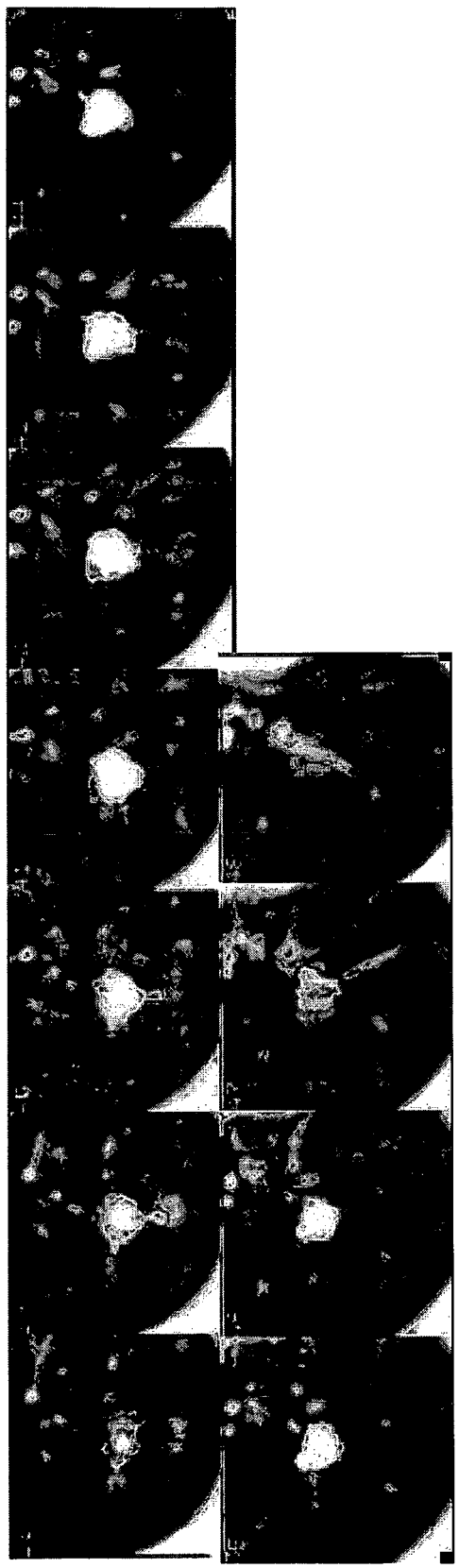
FIG. 9 shows the determined extent of a nodule superimposed on the initial image.

A sample scan image is shown in FIG. 3, and the results of progressive processing steps on the image are shown in FIGS. 4 to 8. An output of the algorithm, based on the sample scan image, is shown in FIG. 9.

1. Fuzzy/Contrast Region Growing

The user of the software inspects the image to identify an area containing a nodule and selects a seed point (step 12), within a specified one of the slices, which appears to be within the nodule. The remainder of the image processing is preferably carried out without user input; hence, the process is semi-automated.

In an alternative embodiment, the user may be required to identify an area containing a nodule, for example by drawing a box or other shape around the area. The seed point may be derived from that area, for example by taking as the seed point the centre of the area or the point having the highest intensity within the area.

The user of the software may be a radiologist, who can be relied upon to identify a point within a nodule. The user may instead identify a point close to a nodule, but not falling within it. As will be explained in more detail below, the method derives an optimum seed point which is insensitive to the precise seed point location chosen by the user, even in some cases where the initial seed point is outside but close to a nodule. However, if the initial seed point is clearly in a background area, because the intensity at the seed point is low, the initial seed point may be moved automatically to a nearby point of high intensity before the rest of the algorithm is applied.

In an alternative embodiment, the seed point may be identified from the scan image automatically, and input to the processing steps below. In that case, no user input is required, so that the process becomes fully automatic.

1.1 Find Foreground Region

First, a rough estimate is obtained of the extent of the region by means of a local threshold-based segmentation process (step 14). A local 3D volume of about 3 cm in each direction (for example, 61×61×21 pixels at 0.5 mm/pixel in the x and y directions, 1.5 mm separation in the z direction), centered on the seed point, is cropped from the whole 3D image, and a local adaptive segmentation algorithm is performed using a local 3D mask of 11×11×3 pixels, so as to segment the image into a plurality of connected objects, as described below. Alternatively, a 2D local mask of 11×11 cm may be used.

Fine Segmentation

The local mask is used to derive a threshold intensity value for each point. This means that the threshold is sensitive to the local contrast and can distinguish low contrast nodules from their background.

The threshold intensity is set to be the mean of the centroids of the intensity above and below the threshold.

Figure 4:
FIG. 4 shows the slices of FIG. 1 after a fine segmentation step.

The specific algorithm proceeds as follows:
1) For each pixel within the local volume:
   a. Define the local mask for that pixel
   b. Set initial threshold intensity as the average intensity within the mask
   c. Calculate a histogram of intensity within the mask area
   d. Repeat:
     i. Calculate the centroid C1 of the part of the histogram below the threshold intensity
     ii. Calculate the centroid C2 of the part of the histogram above the threshold intensity
     iii. Update the threshold to the mean of C1 and C2
   e. Until the threshold converges to the mean of C1 and C2
   f. Shift the threshold by a constant intensity value, which is predetermined according to the application
   g. If the intensity of the current pixel is higher than the shifted threshold, define this pixel as foreground; otherwise, define it as background
2) Next pixel within the local volume The result of fine segmentation on the sample image is shown in FIG. 4. Note that FIGS. 4 to 7 are binary images; any grey levels in the images are printing artefacts.

Fill Holes

The foreground objects acquired by fine segmentation may include 'holes' i.e. background pixels surrounded by foreground pixels. This arises because of the sensitivity of the fine segmentation to small local differences in contrast. Since the foreground objects may represent nodules, they are expected to be solid. Hence, a hole-filling algorithm is used to fill such holes (step 16), in other words to convert them to foreground pixels. Any suitable hole-filling algorithm may be used. For example, a polygon is fitted to an object containing a hole within a slice, and the pixels within the polygon are all set as foreground.

Figure 5:
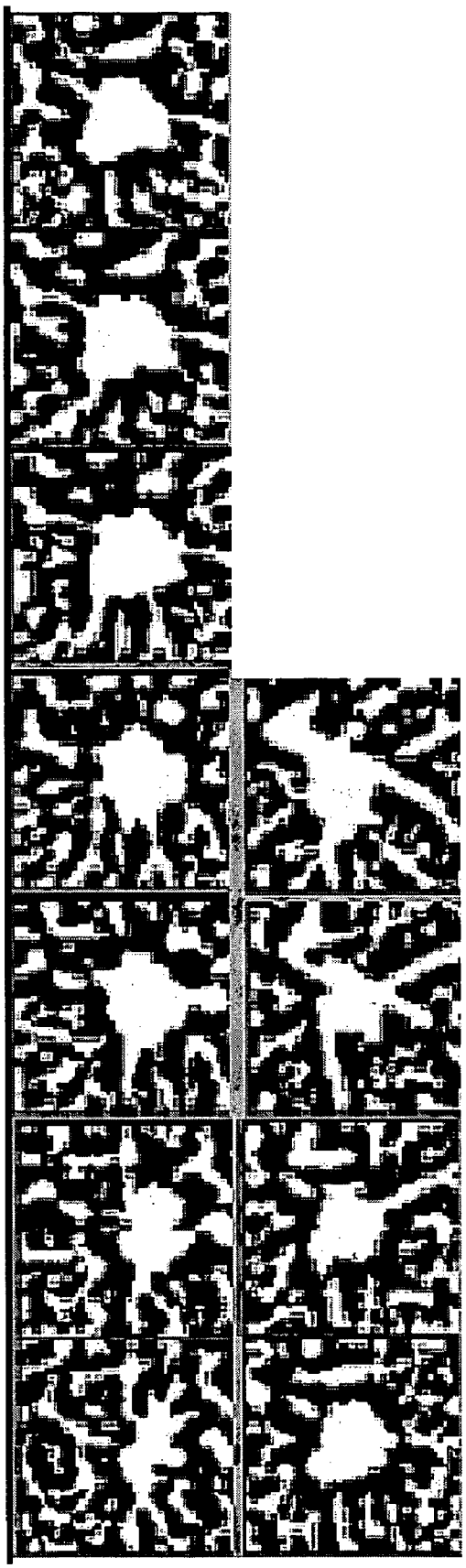
FIG. 5 shows the slices of FIG. 4 after a hole-filling step.

The result of hole filling in the sample image is shown in FIG. 5.

Recover Object Containing Seed

The slice which contains the seed point will normally comprise many segmented regions. The region which contains the seed point is determined using a 3D binary region-growing scheme (step 18).

Binary Region Growing in Initial Slice

The binary region-growing algorithm is first performed on the slice containing the seed point, as follows:

1) Label the seed point 3D pixel ('voxel') as belonging to the desired region
2) Assign the same label to all neighboring foreground voxels
3) Repeat
    a. Take each labeled voxel and assign the same label to each of its neighboring foreground voxels
4) Until there are no more neighboring foreground voxels.

In other words, the label propagates to neighboring foreground voxels, starting with the seed point. Neighboring voxels are those within the slice that are displaced by one pixel spacing in the horizontal (x) and/or vertical (y) direction.

One possible implementation of the binary region-growing algorithm involves the use of a stack to store unlabelled neighboring voxels. As is well known, a stack is last-in, first-out data structure in which the last element added or 'pushed' onto the stack is the first element which can be retrieved from or 'popped' off the stack. The implementation proceeds as follows:

1) Push seed point onto stack
2) Repeat
    a. Pop voxel off stack
    b. Assign label to popped voxel
    c. Push all adjacent unlabelled foreground voxels onto stack
3) Until stack is empty Connected Regions Connected regions in adjacent slices, or in the z direction generally, are determined using the binary region-growing algorithm described above, but taking as the seed point the pixel having the same x and y coordinates as the seed point in the initial slice. In other words, the seed point is displaced in the slice spacing direction (z) to generate a seed point in the current slice and the corresponding regions in adjacent slices are labeled in the same way.

The user may choose a seed point close to the edge of a nodule in a slice, which no longer falls within the nodule if directly transposed into the next slice. To solve this problem, in one alternative the seed point in the new slice may have the x and y coordinates of the centre of the labeled region in the previous slice. In a second alternative, once the labeled region has been determined in one slice, a circular core of pixels is defined around the centre of the labeled region. A foreground pixel in the new slice having the x and y coordinates of one of the core pixels in the old slice may be taken as the seed pixel in the new slice.

Figure 6:
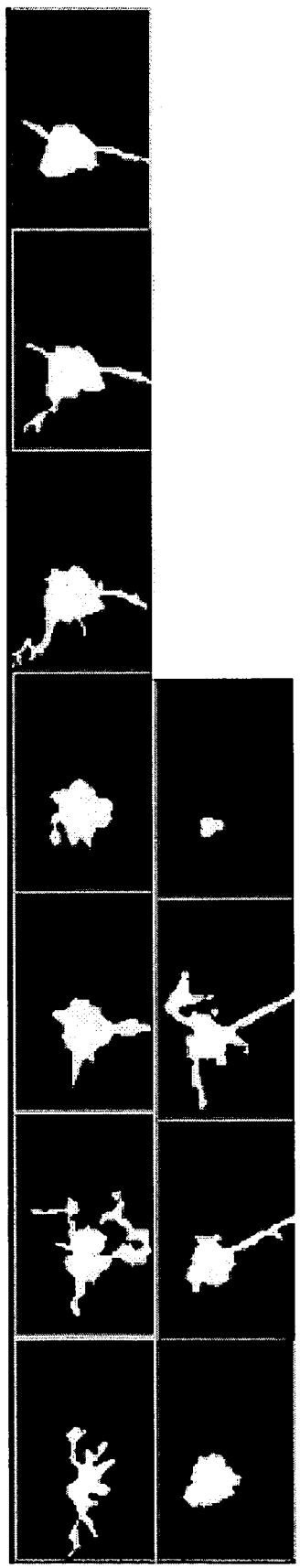
FIG. 6 shows an initial region identified in the slices of FIG. 3.

If the seed point in the new slice is not a foreground pixel, or there are no foreground pixels in the displaced core of the second alternative, then no more slices are considered in that direction. Once the regions have been connected in both directions from the initial slice, the process of identifying connected regions ends, with a single labeled 3D region encompassing the seed point. The labeled region in the sample image is shown in FIG. 6.

Foreground Region

The 3D labeled region encompassing the seed point is defined as the foreground region F; this region is expanded as described below, to serve as a mask for further processing.

1.2 Calculate Mask by Augmenting Initial Region

The foreground region F is expanded using a distance transform method to obtain a mask M containing both foreground and background (step 20). This is important, since lack of background will result in non-optimal estimation of parameters used in subsequent region-growing algorithms. The proportions of foreground and background may be approximately equal.

A known 2D distance transform method is applied to the inside part of the foreground region F in each slice, and the maximum distance S to the boundary is obtained, indicating the size of the foreground region. The 2D distance transform method is then applied to the outer side of the region, until the boundary of the expanded region has a distance S from the boundary of the foreground region F.

Next, the foreground objects segmented by the fine segmentation process that are not labeled as part of the foreground region F are removed from expanded region. The expanded region including the foreground region F, but with the unlabelled foreground objects removed, is defined as a mask M. A background region B is defined by subtracting the foreground region F from the mask M. The mask M, the foreground region F and the background region B are used for subsequent calculations. The mask M for the sample image is shown in FIG. 7.

2. User-independent Seed Point

As described so far, the definition of the mask M depends on the selection of the seed point by the user. For the results of the detection algorithm to be reproducible, a user-independent seed point must be obtained. This is done by defining an 'optimum union mask' $M_0$, which is initially a null region.

At the beginning of each iteration, $M_0$ is replaced by the union of M and $M_0$. A central core or 'yolk' of the mask $M_0$ is found using a distance transform method to erode k layers of the mask $M_0$. The pixel with highest intensity within the yolk of the mask $M_0$ (or optionally, the highest intensity point on the longest line in the z direction within the yolk) is defined as the seed point $S_0$ (step 22) and the entire process described above from '1.1

Find Foreground Region' (steps 14 to 22) is repeated with $S_0$ instead of the initial user-selected seed point. The process is repeated until $M_0$ converges to M, to within a predetermined degree (step 24).

The process can be summarized in pseudo-code as follows:

$M_0=0$

Do

```
{
FindUnion(M₀,M )
FindYolk(M₀,Yolk)
S₀ = GetMaxIntensityPoint(Yolk)
M = Find Mask(M₀, S₀)
} while(M₀! = M )
```

The optimum seed point $S_0$ is taken as the highest intensity point on the longest line in the z direction within the mask. If it is not the same as the user-provided seed point, the optimum seed point is taken as the new seed point.

All subsequent steps are performed using the optimum mask $M_0$ and optimum seed point $S_0$. Foreground segmented objects excluded by the fine segmentation and binary growing, and therefore falling out side the mask $M_O$, cannot therefore affect the determined extent of the nodule.

3. Calculate Statistics

The mean and the standard deviation of the intensity and gradient distributions of the foreground and background regions F and B are determined. The mean of the background intensity $\mu_B$, the mean of the foreground intensity $\mu_F$, the standard deviation of the background intensity $\sigma_B$ and the standard deviation of the foreground intensity $\sigma_F$ are calculated. A parameter $\epsilon$ is estimated by counting the number of the foreground standard deviations $\sigma_F$ that the seed point is away from the background mean intensity $\mu_B$ and this is taken as the measure of the contrast, which is subsequently used in constructing a fuzzy map as described below.

4. Construct Fuzzy Connected Map

A fuzzy object extraction technique is used to define a 3D map of fuzzy connectivity of each pixel within the mask $M_O$ with respect to the optimum seed point $S_O$ (step 26). A fuzzy affinity function between adjacent pixels is defined and the fuzzy connectivity between each pixel and the optimum seed point $S_O$ is derived by finding the affinity along a path between the pixel and the optimum seed point $S_O$.

Figure 10:
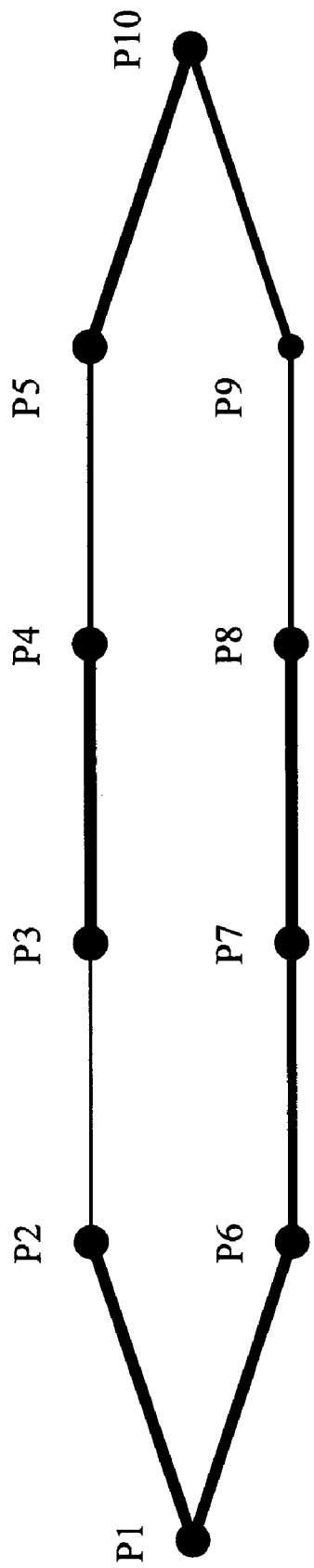
FIG. 10 is a diagram illustrating the determination of fuzzy connectivity according to an embodiment of the present invention.

The fuzzy connectivity between two points (not necessarily adjacent) is obtained by considering the path with the strongest affinity between two points. The path with the strongest affinity is chosen as the best path and the strength of each path is equal to that of the weakest affinity of adjacent points along the path. This concept is illustrated in FIG. 10, where two possible paths between points P1 and P10 are depicted. Think of this as a set of ropes tied together with different thicknesses and therefore different strengths. If the top chain of ropes (from P1 to P10) is pulled apart, it will break at the P2-P3 link; while the bottom set of ropes will break at the link P8-P9. Therefore the bottom rope is stronger than the top one with the strength equal to the strength of P8-P9 link. The strength between two adjacent points is the affinity between those points.

The affinity between two spatial elements (spels)—either 2D pixels or 3D voxels—is a measure of the probability that they belong to the same object. This probability is a function of closeness (i.e. Euclidian distance) and the similarity of the image features (i.e. intensity) between those spels. Fuzzy affinity must satisfy the following conditions:

Reflectivity: for all $(x,x) \in X \times X$, $\mu(x,x)=1$ and

Symmetric: for all $(x,y) \in X \times X$, $\mu(x,y)=\mu(y,x)$ where $\mu$ ($\mu:X \times X \rightarrow [0,1]$) represents the fuzzy affinity for a 2-ary relation. The first condition indicates that the fuzzy affinity of a spel to itself is always 1, and the second condition indicates that the fuzzy affinity of point 1 to point 2 is the same as that of point 2 to point 1.

The general model for fuzzy affinity is given by:

$$\mu_k=(c,d)=h(\mu_a(c,d),f(c),f(d),c,d)$$

where h is a scalar value with range [0,1], c and d are image locations of two spels, and f(i) is the intensity of spel i. $\mu_a$ is an adjacency function based on distance between two spels which, for n-dimensional coordinate spels, is given by, $$\mu_a(c,d) = \begin{cases} 1, & \text{if } \sqrt{\sum_{i=1}^{n}(c_i-d_i)^2} \leq 1 \\ 0, & \text{otherwise} \end{cases}$$

A simplified shift invariant version is defined as $$\mu_k(c,d)=\mu_a(c,d)[\omega_i h_i(f(c),f(d))+\omega_g(1.0-h_{gk}(f(c),f(d)))]$$

if $c \neq d$, and $$\mu_k(c,c)=1$$

where the subscripts 'i' represents the calculations related to intensity and 'gk' represents the calculations related to gradient values in relevant direction (which could be x, y, z) respectively. $\omega_i$ and $\omega_g$ are free parameter weight values whose sum is 1. The value of 0.9 for $\omega_i$ and 0.1 for $\omega_g$ has been chosen to allow intensity similarity to have more effect. The fuzzy affinity that was used for the current function is:

$$h_i(f(c),f(d)) = e^{-\frac{[(1/2)(f(c)+f(d))-m_i]^2}{(S_d)^2}}$$

$$h_{gx}(f(c),f(d)) = e^{-\frac{[(|f(c)-f(d)|/dx)-m_{gx}]^2}{(S_{gx})^2}}$$

$$h_{gy}(f(c),f(d)) = e^{-\frac{[(|f(c)-f(d)|/dy)-m_{gy}]^2}{(S_{gy})^2}}$$

$$h_{gz}(f(c),f(d)) = e^{-\frac{[(|f(c)-f(d)|/dz)-m_{gz}]^2}{(S_{gz})^2}}$$

where $m_i$, $s_i$, $m_g$ and $s_g$ are the Gaussian parameters for the intensity and gradient. These can be predefined, or are estimated from a small region around the seed point as described below.

Parameter Calculation

The mean and standard deviation $\sigma$ of the intensity and gradient are calculated over all points within the optimum mask $M_O$. The parameters related to the gradients are computed in three directions (x, y and z) separately. The corresponding $\sigma$ are calculated based on the difference between maximum and minimum gradient.

The calculation of the statistics is now described in more detail. The parameter $m_i$ is taken as the intensity of the seed whereas $m_{gx}$, $m_{gy}$ and $m_{gz}$ are taken as the means of the gradients in x-, y-, and z-direction respectively. The parameters $S_{gx}$, $S_{gy}$ and $S_{gz}$ are the standard deviation of the gradients in their respective direction.

The standard deviation ($S_d$) appearing in the affinity expression plays a major role in the formation of the fuzzy map and hence the determination of the boundary of the nodule. If it is too big, the affinity curve will be relatively flat. Resultantly, the background region will have higher affinity and region growing will result in over-segmentation. On the other hand, if it is too small, the shape of the affinity curve will be narrow and the foreground will have less affinity with the seed and the result would be under-segmented. Ideally, the curve should be spread to such an extent that the background has minimal but finite affinity with the seed.

Isolated nodules are under-segmented and pulmonary nodules are over-segmented if no correction is made for the standard deviation of the affinity curve. Also, it has been observed that isolated nodules have higher contrast than pulmonary nodules. We therefore adjust $S_d$ by taking into consideration the above findings. A factor $f_t$ is determined and multiplied by the $S_F$ (foreground standard deviation) to get a value of $S_d$ which is actually used in the fuzzy expression.

t-Value as a Measure of Contrast

The significance of the difference of means of two samples can be measured by a statistic called Students t. We use this as an indicator of the contrast between the foreground region F and the background region B. Let $N_F$ be the number of the voxels in the foreground region F and $N_B$ be the number of voxels in the background region B. Let $x_i$ be the intensity at voxel i. $\mu_F$ and $\mu_B$ are the means of the foreground and background regions.

For two distributions having same variance, the t-value is calculated as follows:

First, the standard error of the difference of the means from the pooled variance is calculated as:

$$Se = \sqrt{\left[\frac{\sum_{i \in A}(x_i - \mu_F)^2 + \sum_{i \in B}(x_i - \mu_B)^2}{N_F + N_B - 2}\left(\frac{1}{N_F} + \frac{1}{N_B}\right)\right]}$$

The t-value is computed as:

$$t = \frac{\mu_F - \mu_B}{Se}$$

A higher value of t represents higher contrast. It has been observed that for isolated nodules the t-value is lower than for those attached to blood vessel, indicating that the isolated nodules have high partial volume effect.

We use this information to expand/limit the affinity Gaussian curve by modifying the standard deviation. For lower t-values, the curve is narrow and does not reach to the background mean, so the curve is expanded until the background has some affinity. For higher t-values, the background will have higher affinity, as it is closer to foreground, so the fuzzy affinity curve is made narrow by reducing its standard deviation. The inventor has conducted experiments and found an empirical relationship as follows.

A factor f is defined as:

$$f = \frac{(t - 30)}{30}$$

The values are clipped to 1(−1) if f-value is greater (lower) than 1(−1).

If f>0, f is multiplied by 2.5.
If f<0, it is multiplied by 3.

Let $S_F$ and $S_B$ be the standard deviations of the foreground and background regions respectively.

$S_F$ is divided by 1.25 to make it more aggressive to ensure that we get more regions for isolated nodules.

$$f_t = (x_{seed} - (\mu_B + S_B * f))/S_F$$

$f_t$ is limited between 1.5 to 9.

Finally, the standard deviation is updated as:

$$S_d = f_t \times S_F$$

Fuzzy Map Algorithm

The parameters of the fuzzy map algorithm are as follows:
a) an n-dimensional (nD) array to hold the fuzzy connectivity of the voxels.
b) a queue (Q) to which potential spels are added.
c) a threshold value (x).
d) $f_o(c)$ is the fuzzy connectivity of spel c
e) $\mu_k(c, d)$ is the fuzzy affinity between two adjacent spels 'c' and 'd'.

The algorithm proceeds as follows:
Begin:
1. set all nD cells to zero except for the seed value.
2. push all spels whose fuzzy affinity to the seed is more than zero, i.e. $\mu_k(o, c) > 0$ to Q.
while Q not empty
3. remove a spel c from Q
4. if ($f_o(c) < x$) then
5. find $f_{max} = \max[\min(f_o(d), \mu_k(c, d))]$
6. if $f_{max} > f_o(c)$ and $f_{max} > x$ then
7. set $f_o(c) = f_{max}$
8. push all spels e such that $\mu_k(o, e) > 0$ to Q.
endif
endif
endwhile Explanation:
Step 1: The seed is the only spel in the object.
Step 2: The immediate neighboring spels with fuzzy affinity more than zero are considered.
Step 3: If its connectivity is higher than threshold, no need to check it again.
Step 4: The neighbors added in step 2 are examined one by one
Step 5: Find which among all neighboring spels has the strongest link. The strength of each link is the minimum of the fuzzy connectivity value of the neighboring spel and the fuzzy affinity. i.e. the fuzzy connectivity of each spel holds the fuzzy path strength from the seed value.
Step 6 & 7: If the calculated value in step 4 is larger than the threshold value, set the connectivity of the current spel to this value.
Step 8: Consider all the neighboring spels that have fuzzy affinity more than 0

The algorithm stops when the queue is empty.

Fuzzy Map

When the fuzzy threshold is set to zero, the algorithm finds the fuzzy connectivity value for each voxel in the image relative to the seed point $S_0$. This image can be considered as an enhanced image whose voxels represent how strongly they are attached to the seed point. The fuzzy map for the sample scan image is shown in FIG. 8.

The fuzzy map can be used to find the approximate extent of the nodule, by setting a fuzzy threshold to a predetermined value greater than zero. Experimental results using this technique are described below.

Experimental Results—Predetermined Threshold, Mean and Standard Deviation

Figure 11:
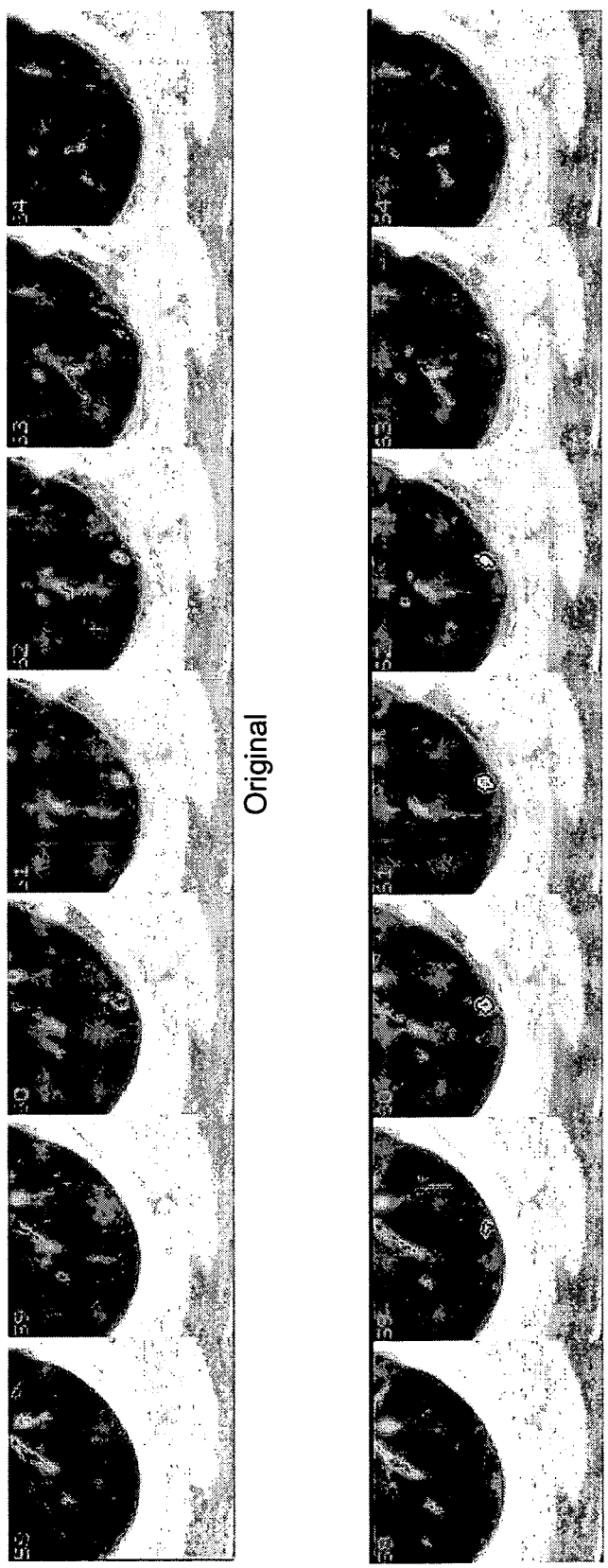
FIGS. 11 and 12 show the results of detection based on fuzzy connectivity region growing using predetermined fixed region statistics.
Figure 12:
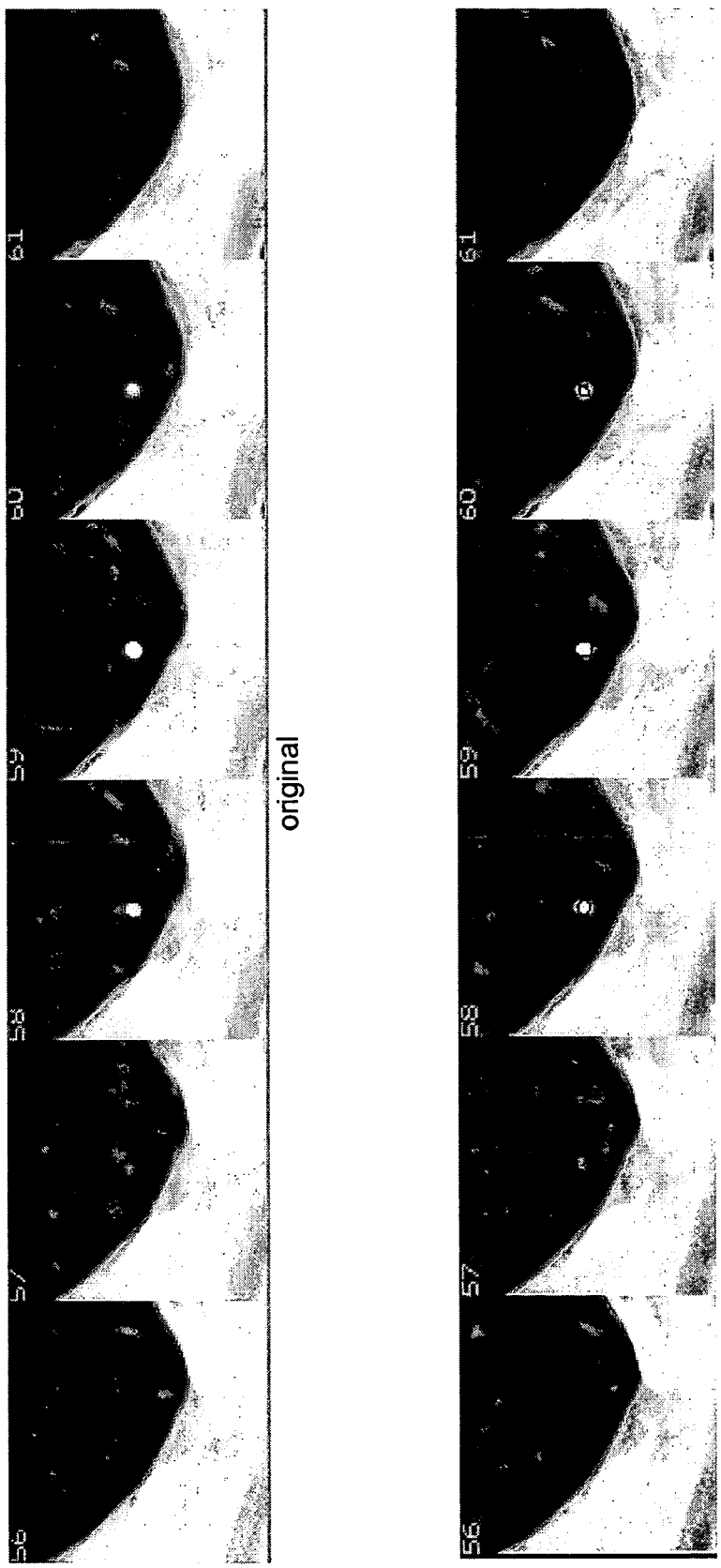

FIGS. 11 and 12 each show a set of original scan slices, and the approximate boundary of the nodule superimposed on the original image. In FIG. 11, the threshold was set at 0.92, with predetermined foreground mean of −100 and standard deviation of 700, while in FIG. 12, the threshold was set at 0.64, with predetermined foreground mean of 10 and standard deviation of 1500.

Estimated Region Statistics

Figure 13:
FIGS. 13 and 14 show the results when the region statistics are estimated by the algorithm from the scan image.
Figure 14:
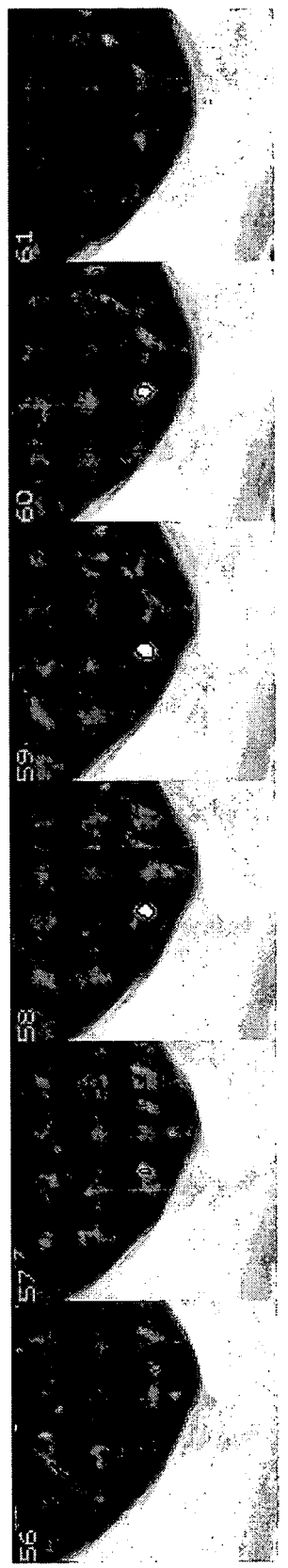

The algorithm can find the initial estimate by calculating the standard deviation and mean of intensity and gradient within a sub-window around the seed point. FIGS. 13 and 14 show the results when the region statistics are estimated by the algorithm from the scan image, using the original images of FIGS. 11 and 12 respectively; note that the results were obtained after trying various different values of the fuzzy threshold. For FIG. 13, the fuzzy threshold of 0.92 was set with the estimated mean of −255 and standard deviation of 780; while for FIG. 14, the fuzzy threshold of 0.9 was used with an estimated mean of 22 and standard deviation of 3270.

Reproducibility

Figure 15:
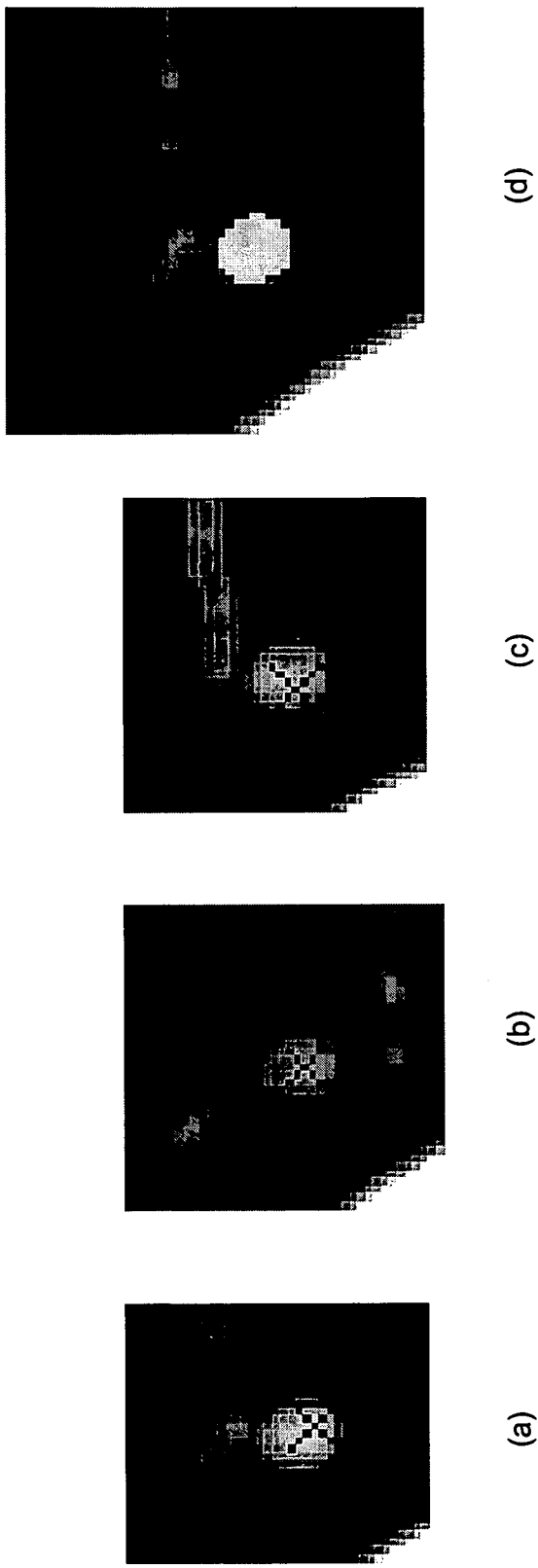
FIG. 15a to 15d illustrate the reproducibility of the algorithm when different seed points are selected within the nodule.
Figure 16:
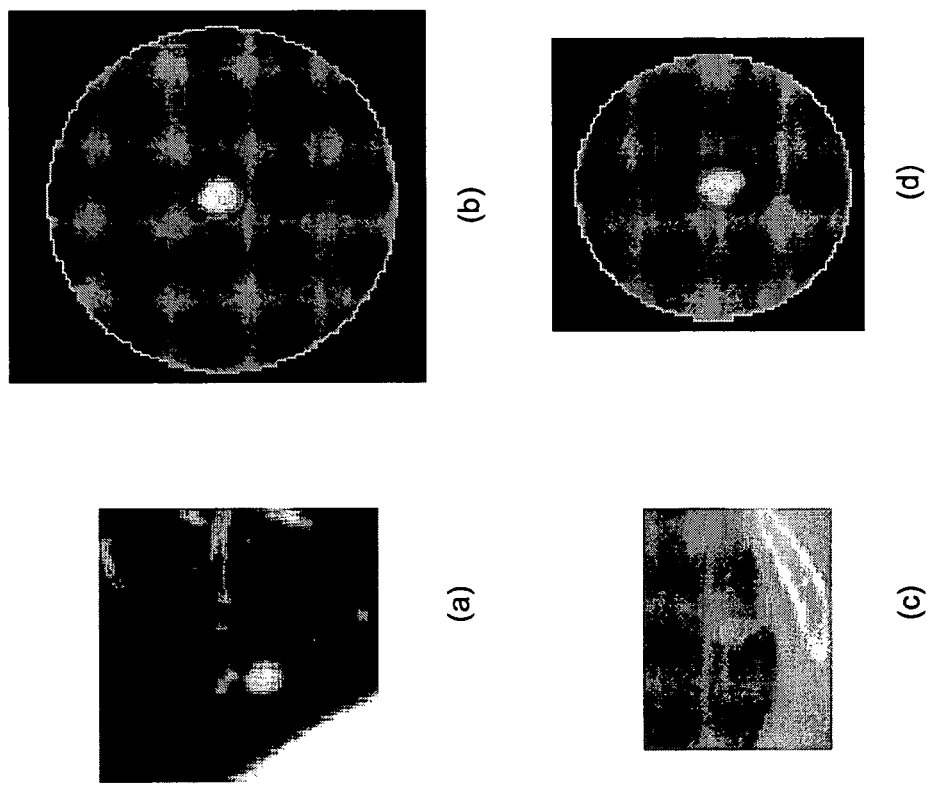
FIG. 16a to 16d show two different scan images together with their fuzzy maps.

The estimated number of voxels included in the nodule region provides a test for reproducibility. The region growing was carried out from different seed locations and all returned the same region size. This is shown in FIGS. 15a to 15c:

9a) seed:114,170,9
9b) seed:114, 172, 8
9c) seed:112, 170, 10 which all produced the same region size of 180 voxels, as shown in FIG. 15*d*.

Fuzzy Connectivity Image

To illustrate the effect of the fuzzy map, the fuzzy threshold was set to zero and region growing was performed to calculate the fuzzy connectivity of each voxel within a predetermined radius, without restriction to the mask $M_O$. The results can be seen in FIGS. 16*a* to 16*d*, where 16*b* is a fuzzy map of the nodule shown in 16*a*, while 16*d* is a fuzzy map of the nodule shown in 16*c*.

Comments

The accuracy of the nodule boundary detected using fuzzy thresholding depends on selection of a suitable threshold value. Experimental results show that there is no one threshold value suitable for all scans of isolated and pulmonary lung nodules. Thresholding on the fuzzy map may be acceptable in some circumstances, but a preferred technique is described below.

5. Contrast Based Region Growing On Fuzzy Map

Instead of setting an arbitrary threshold, the unthresholded fuzzy map can be used as an input to further steps to improve the segmentation. In a preferred embodiment a parameter-free algorithm, using contrast based region growing, is applied to the fuzzy map. In this case, the user only needs to provide the seed point, with no threshold adjustment.

The algorithm is applied only to the area within the mask, excluding its borders and the thorax region. The thorax region is estimated by employing a coarse segmentation scheme. The algorithm is applied to the fuzzy map of the scan image, rather than the original scan image.

Figure 17:
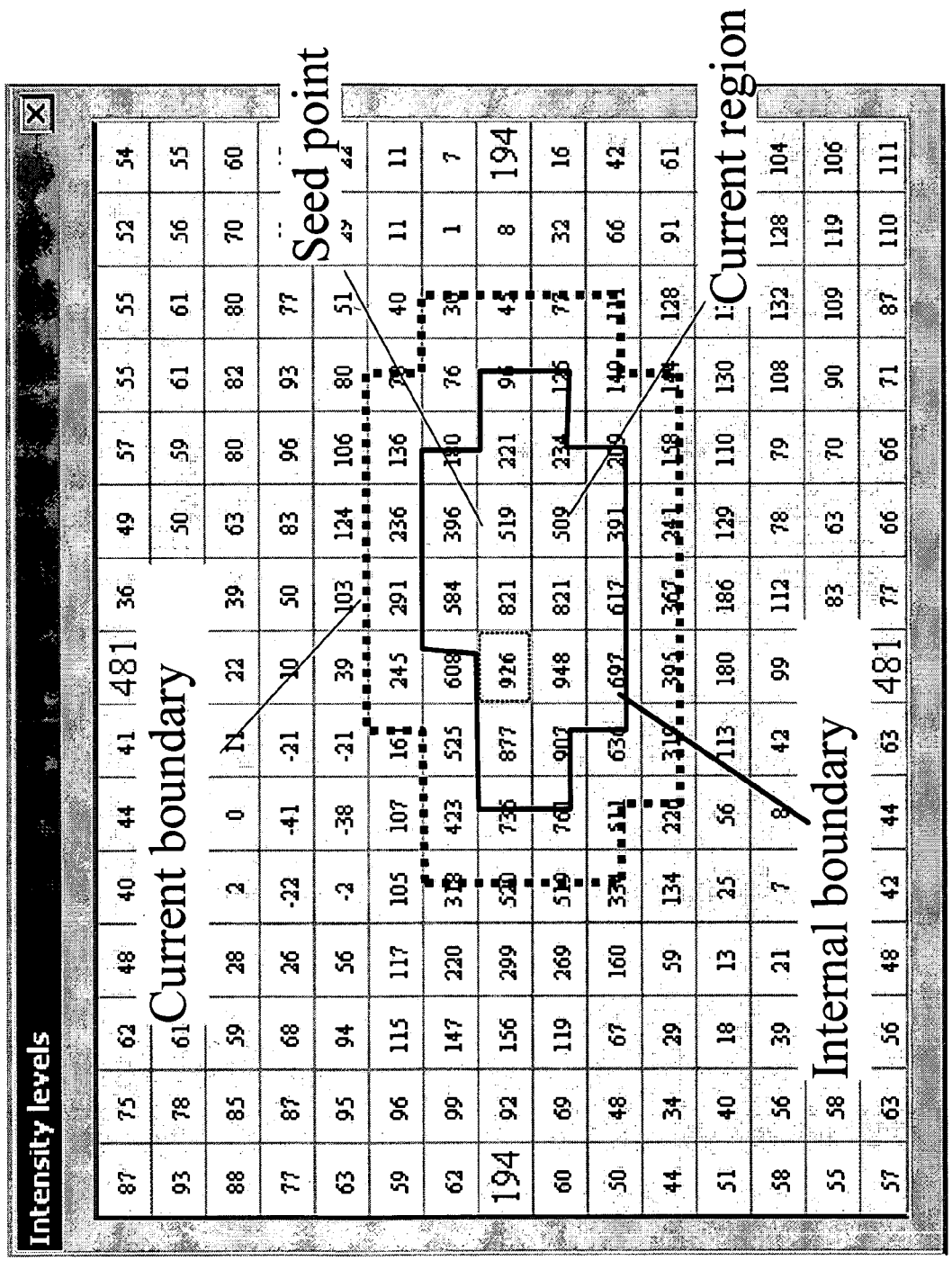
FIG. 17 shows the intensity values of an object within an image according to an embodiment of the present invention.

To explain the contrast-based region growing process the following terms are introduced. FIG. 17 shows the intensity profile of an object (a bright blob).

The current boundary is the set of pixels adjacent to the current region during the growing process. The internal boundary is defined as the boundary produced by the set of connected outermost pixels of the current region. The current region and the two boundaries dynamically change during the growing process.

The peripheral contrast of the region is defined as the difference between the average grey level of the internal boundary and average grey level of the current boundary.

$$C_{per} = \bar{f}_{IB} - \bar{f}_{CB}$$

where $C_{per}$ is the peripheral contrast of a region, $\bar{f}_{IB}$ is the average fuzzy connectivity of the internal boundary and $\bar{f}_{CB}$ is the average fuzzy connectivity of the current boundary.

Another option for calculating peripheral contrast is $$C_{per} = \frac{\sum \ln|Fx^2 + Fy^2|}{n}$$

where

Fx is the x-gradient of the fuzzy connectivity of the internal boundary points and Fy is the y-gradient of the fuzzy connectivity of the internal boundary points.

Average Contrast $$Cav = \frac{\sum |f_i - \bar{f}_F|}{n}$$

where $f_i$ is the fuzzy connectivity for point i on the current boundary, $\bar{f}_F$ is the mean fuzzy connectivity of the foreground region F, and n is the number of points on the current boundary At each iteration of the contrast-based region growing (step 28), one pixel is selected from the current boundary and added to the current region. The selection priority of pixels in the current boundary is determined on the basis of their intensity and the distance to the centre of the current region. The combination of intensity and distance produces a single priority factor W.

$$W = W_I * W_D \qquad (1)$$

$$W_I = \frac{1}{1 + K1 * (f_i - \bar{f}_F)} \qquad (2)$$

$$W_D = \frac{1}{1 + K2 * D} \qquad (3)$$

where

K1 and K2 are the weighting factors. In general, K1+K2≠1. In one example, K1=0.01 and K2=0.1.

D is the distance between the candidate pixel and the seed $S_0$.

Figure 18:
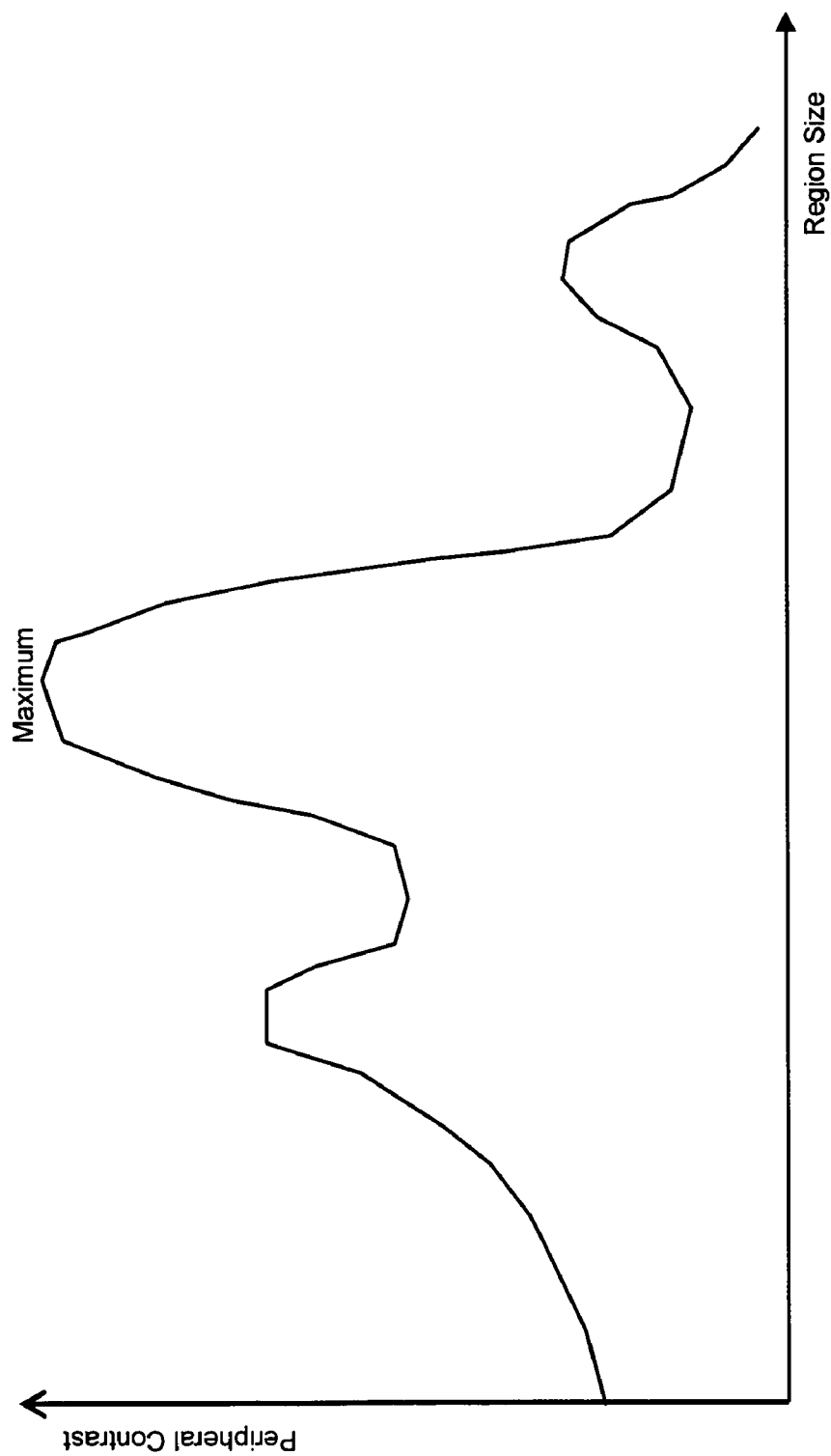
FIG. 18 is a schematic graph of peripheral contrast during region growing in the fuzzy map according to an embodiment of the present invention.

When a pixel is added into the current boundary, the internal boundary and the current boundary are updated. The peripheral contrast is then calculated and added to a vector which relates to the current region size. A schematic smoothed graph of peripheral contrast against region size is shown in FIG. 18.

This process continues until the region reaches the predefined maximum size or extent—for example, until the region fills the extended mask $M_O$. The highest peripheral contrast value obtained during region growing is selected (step 30) as indicating the optimum region, with a boundary most likely to correspond to that of the nodule. This optimum boundary is then output (step 32) as the detected boundary of the nodule.

In an alternative embodiment, the region growing is started from a point different from the optimum seed point $S_0$, for example, from the point having the highest intensity in the original scan image within the foreground region F. It is then necessary to check that the detected nodule boundary contains the optimum seed point $S_0$. Hence, region growing from the optimum seed point $S_0$ is preferred.

In an alternative embodiment, the first maximum peripheral contrast value obtained during region growing is selected as indicating the optimum region, rather than the global maximum value.

Contrast Based Region Growing Algorithm

The algorithm for contrast based region growing is as follows:

(1) Define the maximum region size.
(2) Select the seed point $S_0$ and add it to the current region.
(3) Use second order connectivity (8 neighbors for 2D and 26 for 3D) to find neighbors and first order connectivity (4 for 2D, 6 for 3D) to find/update the current boundary.

Sort the points in the current boundary in ascending order by the priority factor given by Equation (1) above.
(4) Find/update the internal boundary.
(5) Calculate the average/peripheral contrast and put the value in the average/peripheral contrast vector.
(6) Find the point with the highest priority W (from Equation 1) in the current boundary and add to the current region. If the region reaches the pre-defined maximum size, go to step 7, otherwise go to step 3.
(7) In the average/peripheral contrast vector, find the highest maximum value (local maximum) and the corresponding region size and output the current region according to this size. The boundary of the current region is taken as the extent of the nodule.

Output

The detected nodule boundary may be output by displaying it as an outline superimposed on the original scan image. Additionally or alternatively, various nodule metrics may be calculated from the optimum region and/or its boundary. For example, the presence of spikes on the nodule surface may indicate a malignant nodule. Therefore, a shape metric calculated from the optimum boundary may be output. Alternative significant metrics include the volume or surface area of the optimum region. The optimum region may be combined with data from the scan image to determine the mass and/or density of the nodule, which may also be output.

Experimental Results

The results of experiments conducted using the algorithm are described below:

Tests with Synthetic Images

Figure 19:
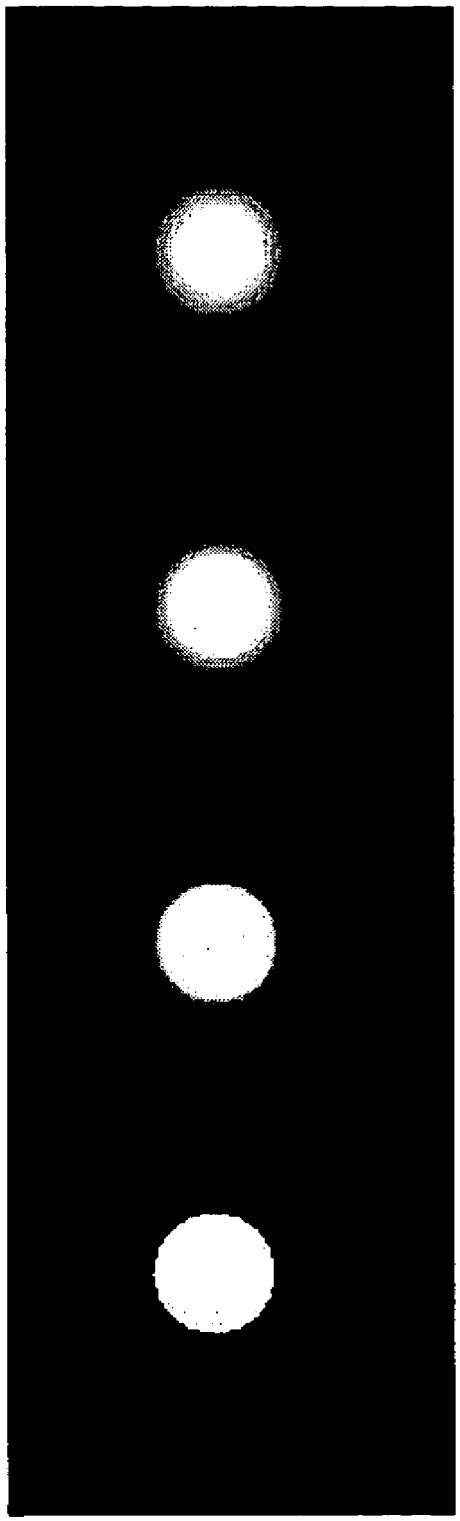
FIG. 19 shows a binary circle and blurred circles used to test region growing.

FIG. 19 is a synthetic image with a binary circle (pixel size 1291) and three blurred circles (Gaussian blur with sigma 1, 2 and 3 respectively) derived from the binary one. When the region growing algorithm was applied to the three blurred circles (maximum size 2000, K1=0.1, K2=0.01) they all produced a circle as the result.

Using average contrast based region growing, the sizes of the circles are 1455, 1611 and 1752 pixels respectively. These are much bigger than the true value (1291 pixels).

For peripheral contrast based region growing, according to the algorithm above, the sizes of the circles are 1290, 1272 and 1224 pixels respectively. These are very close to the true value (1291 pixels).

Therefore peripheral contrast based region growing appears more suitable for circular nodule detection. The tests described below all used peripheral contrast based region growing.

Figure 20:
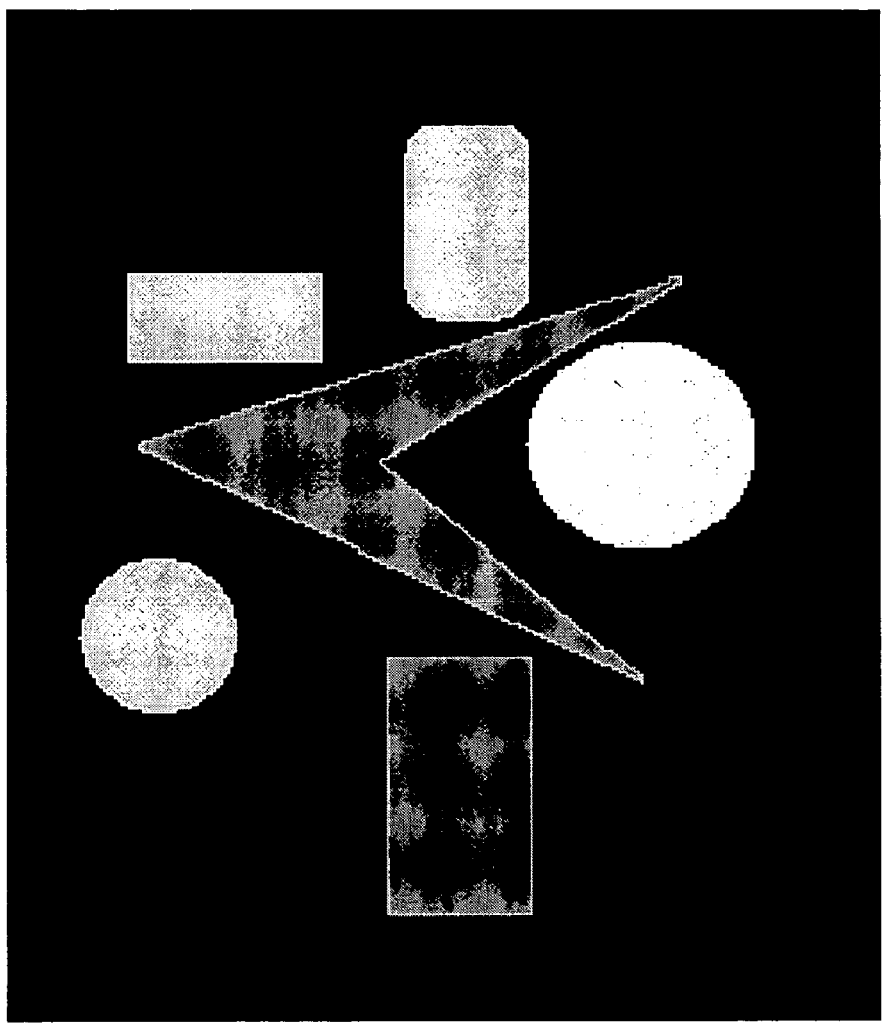
FIGS. 20 and 21 show a synthetic image and the result of peripheral contrast region growing on it.
Figure 21:
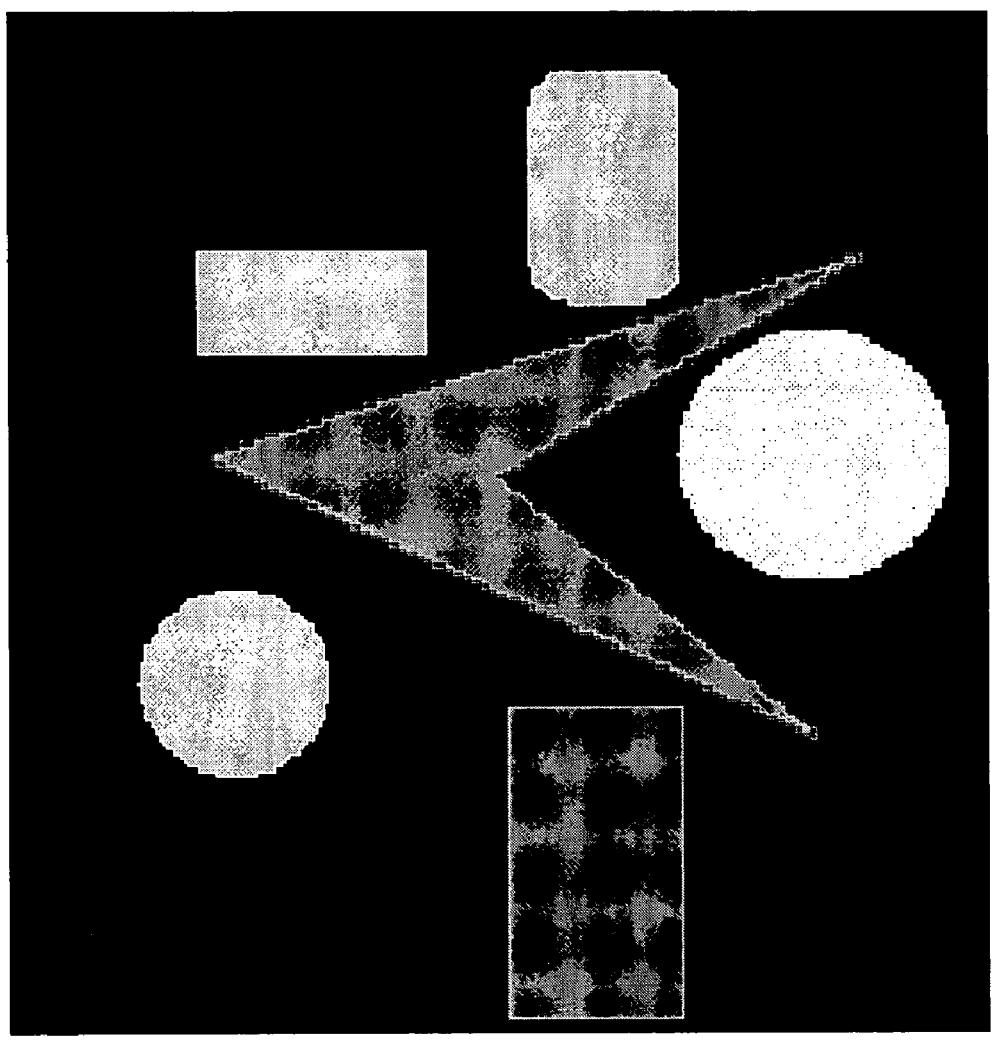

Another test was conducted on a synthetic image with an arrow shaped object as shown in FIG. 20 and the results are shown in FIG. 21. The boundary of the arrow-shaped object was correctly identified, showing that the peripheral contrast based region growing algorithm is also suitable for detecting non-circular objects.

Test with Real Image

Figure 22:
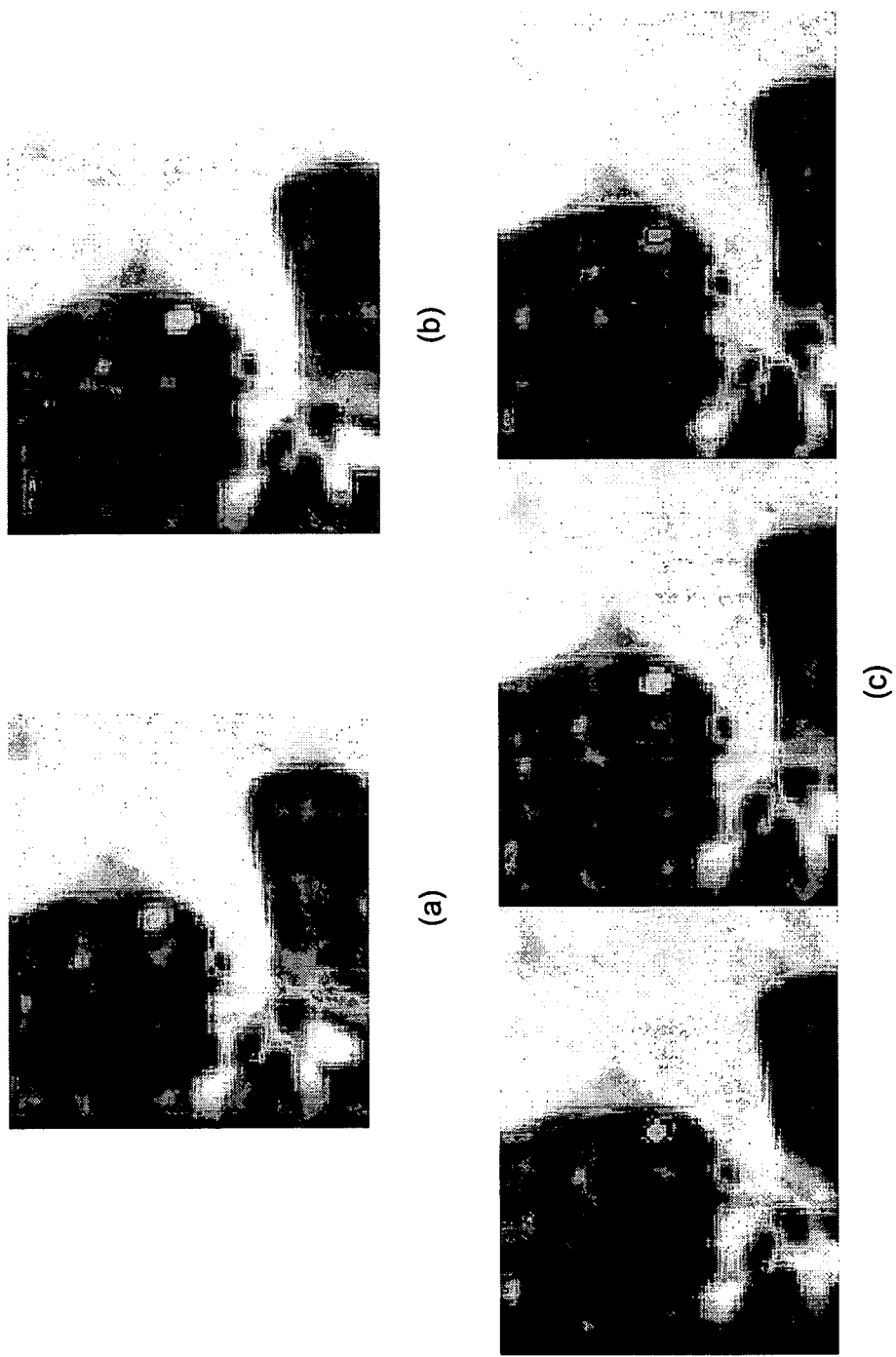
FIGS. 22a to 22c show the results of region growing with a real image as input (both 2D and 3D).

In this test a CT lung image with an isolated nodule is used, and the peripheral contrast region-growing algorithm was used directly on the scan image, without calculating the fuzzy map. The maximum size is set to 100 pixels, k1=0.01 and k2=0.01 and a seed is put in the middle of the bright blob in FIG. 22a. The result image in FIG. 22b shows the optimal region of 2D region growing. The region size is 40 pixels. The result of 3D region growing is shown in FIG. 22c.

Test with Fuzzy Map as Input

Figure 23:
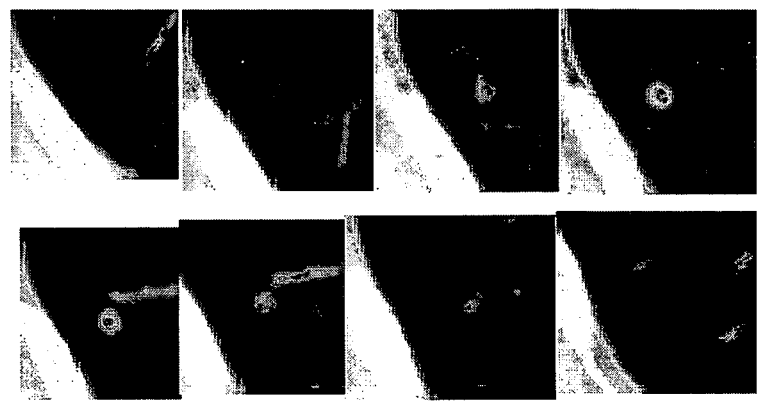
FIGS. 23a to 23c show a real image, a fuzzy map based on the images, and the results of region growing on the fuzzy map.
Figure 23:
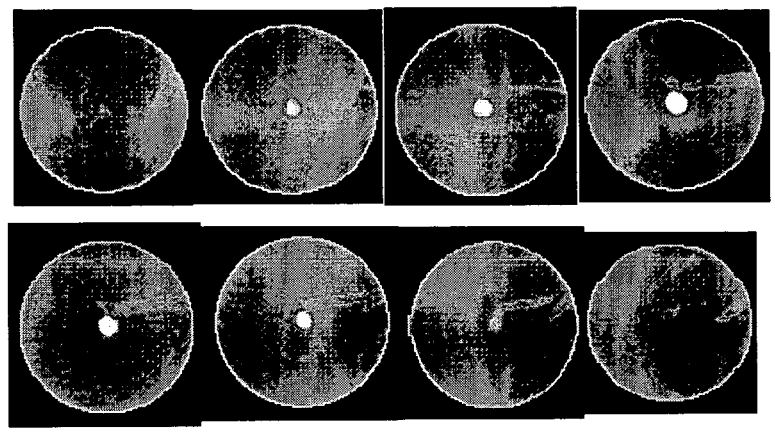
Figure 23:
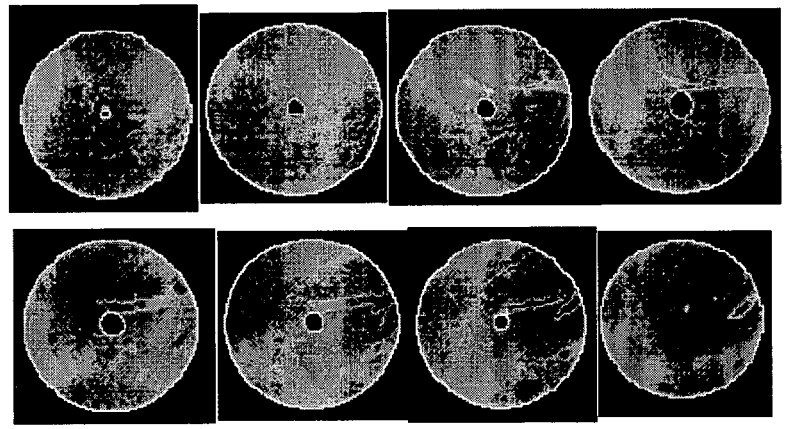

FIGS. 23a to 23c show the results of a test on a real image as shown in FIG. 23a, with the fuzzy maps shown in FIG. 23b and the region-growing results shown in FIG. 23c.

Comparative Tests

Figure 24:
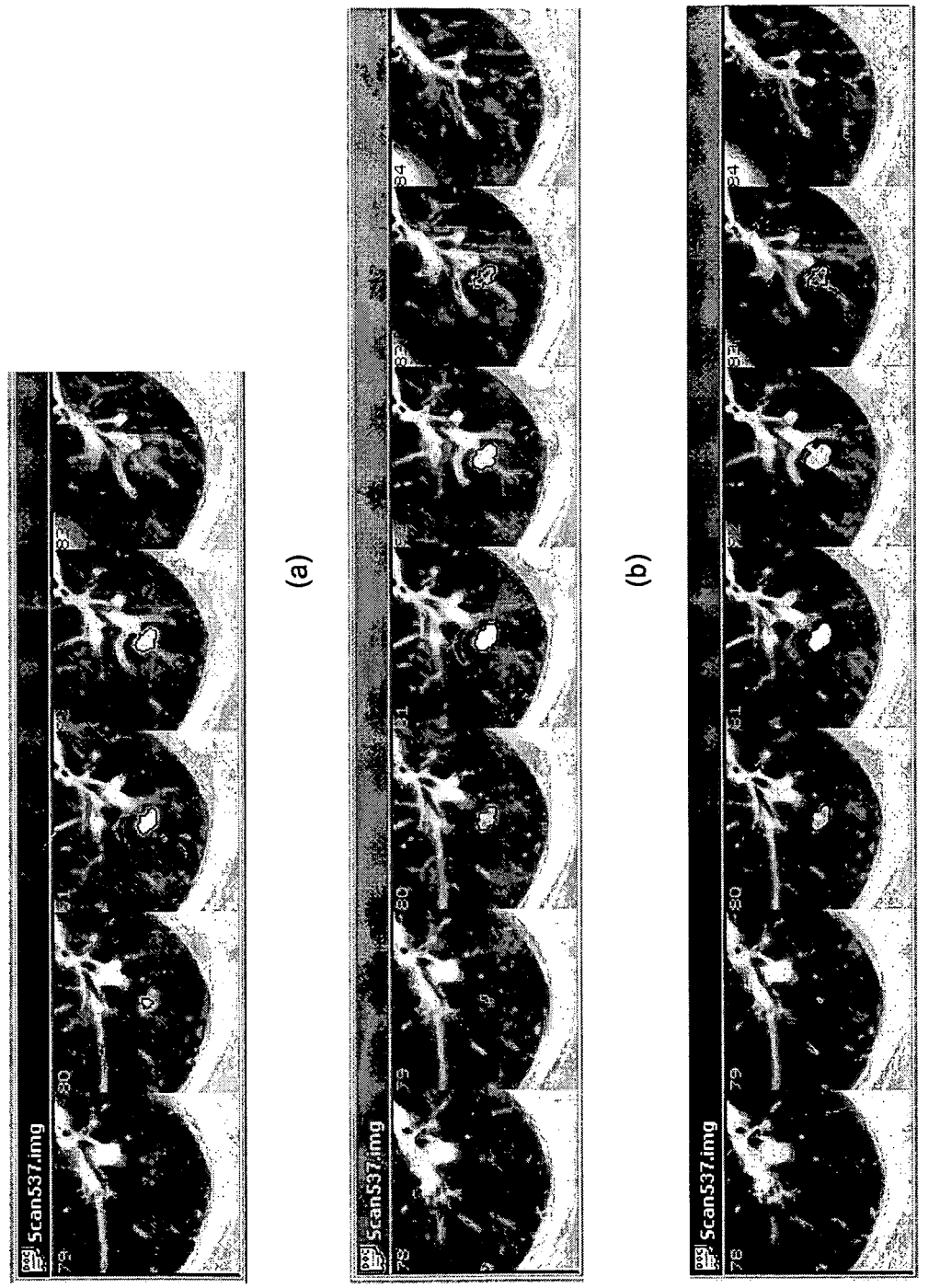
FIGS. 24a to 24c show comparative results using different techniques on a nodule attached to a blood vessel.

FIGS. 24a to 24c show comparative results using different techniques on a nodule attached to a blood vessel. FIG. 24a shows the result using peripheral contrast based region growing on a real image, FIG. 24b shows the result using fuzzy connectivity thresholding (threshold of 0.6) and FIG. 24c shows the result of using peripheral contrast based region growing on an unthresholded fuzzy map with no predetermined parameters.

Figure 25:
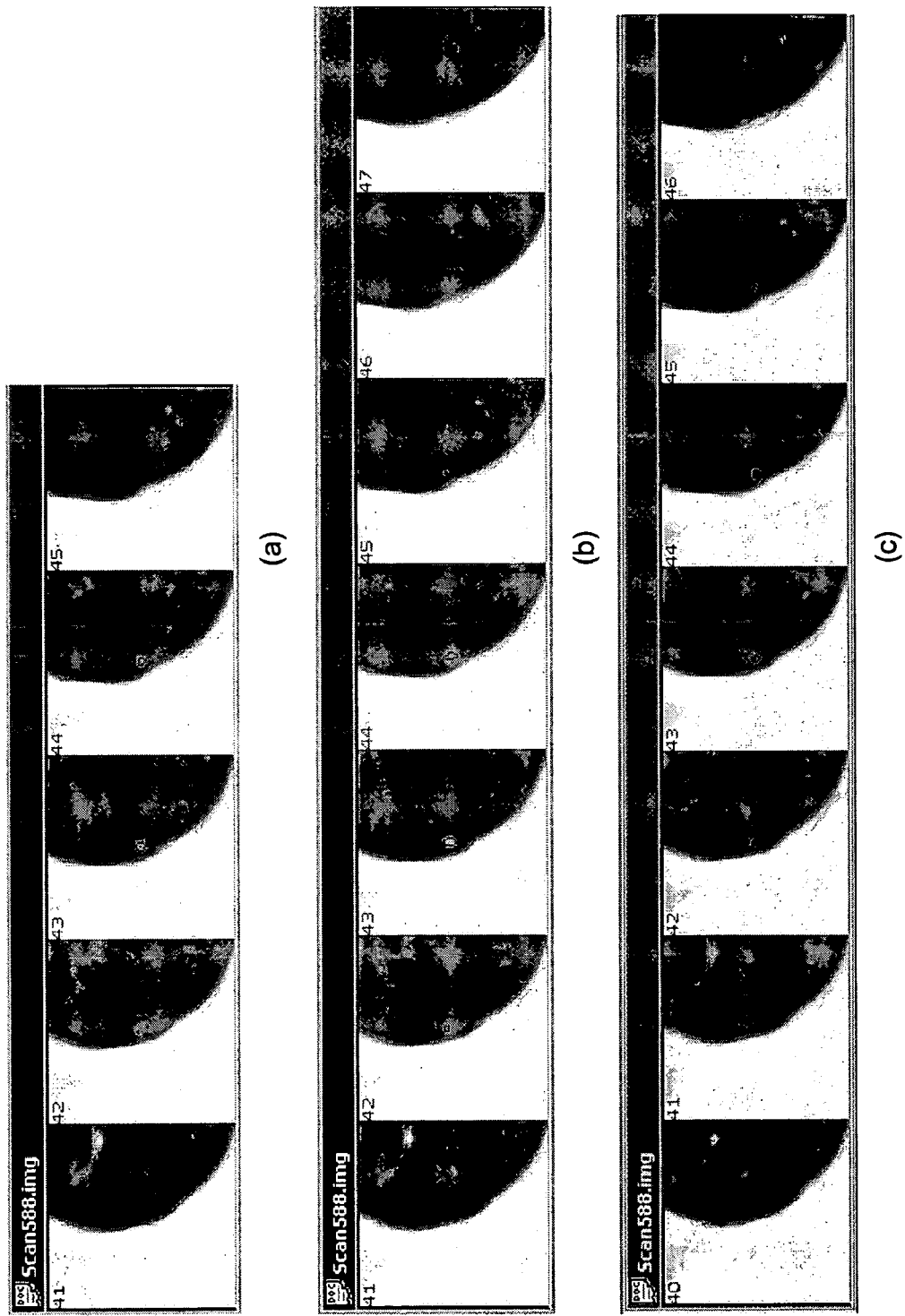
FIGS. 25a to 25c show comparative results on a low-contrast nodule.

FIGS. 25a to 25c show comparative results on a low-contrast nodule using the same three techniques; for FIG. 25b, the threshold is 0.805.

Figure 26:
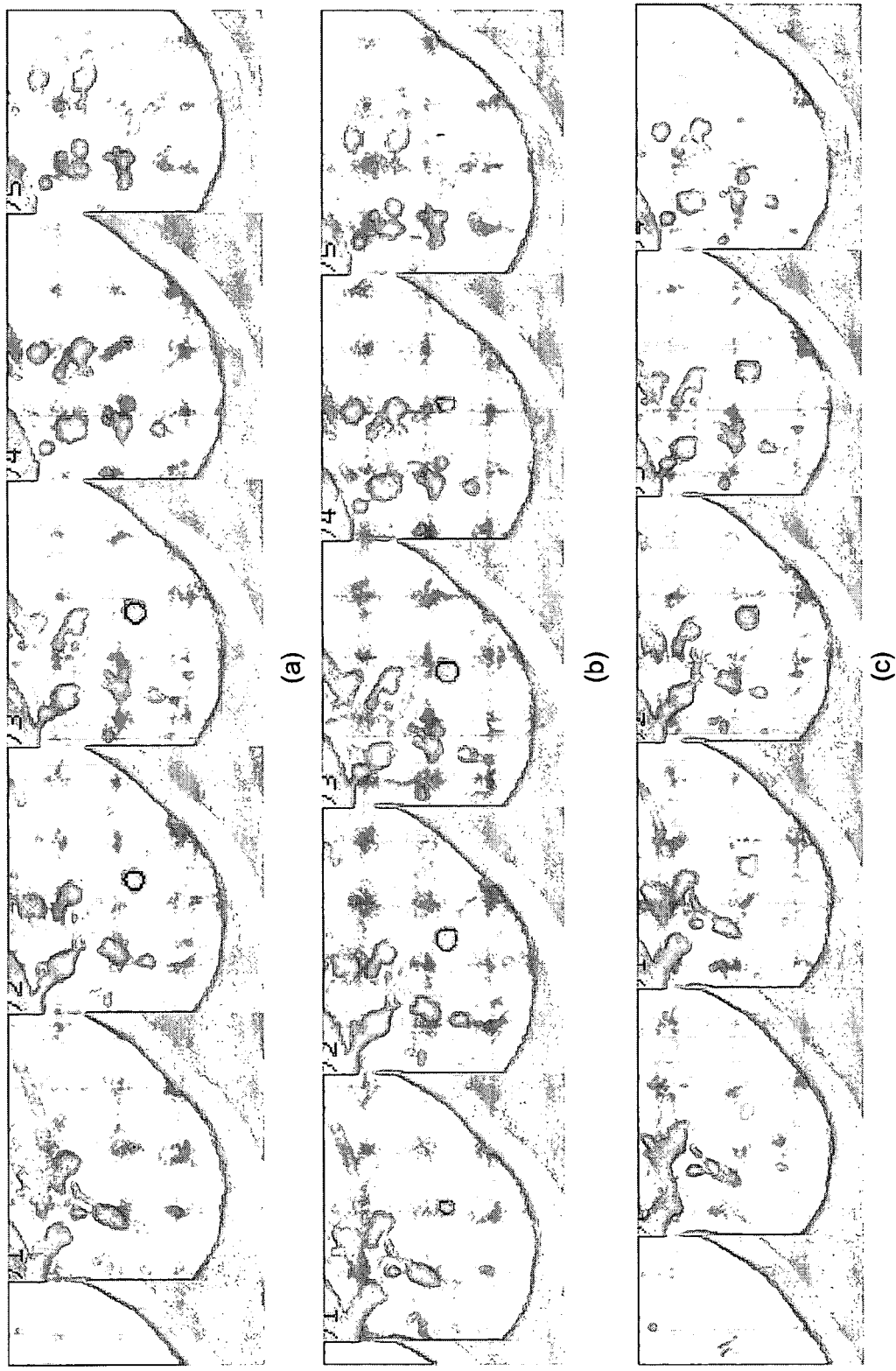
FIGS. 26a to 26c show comparative results on an isolated nodule.

FIGS. 26a to 26c show comparative results on an isolated nodule using the same three techniques; for FIG. 26b, the threshold is 0.91.

Figure 27:
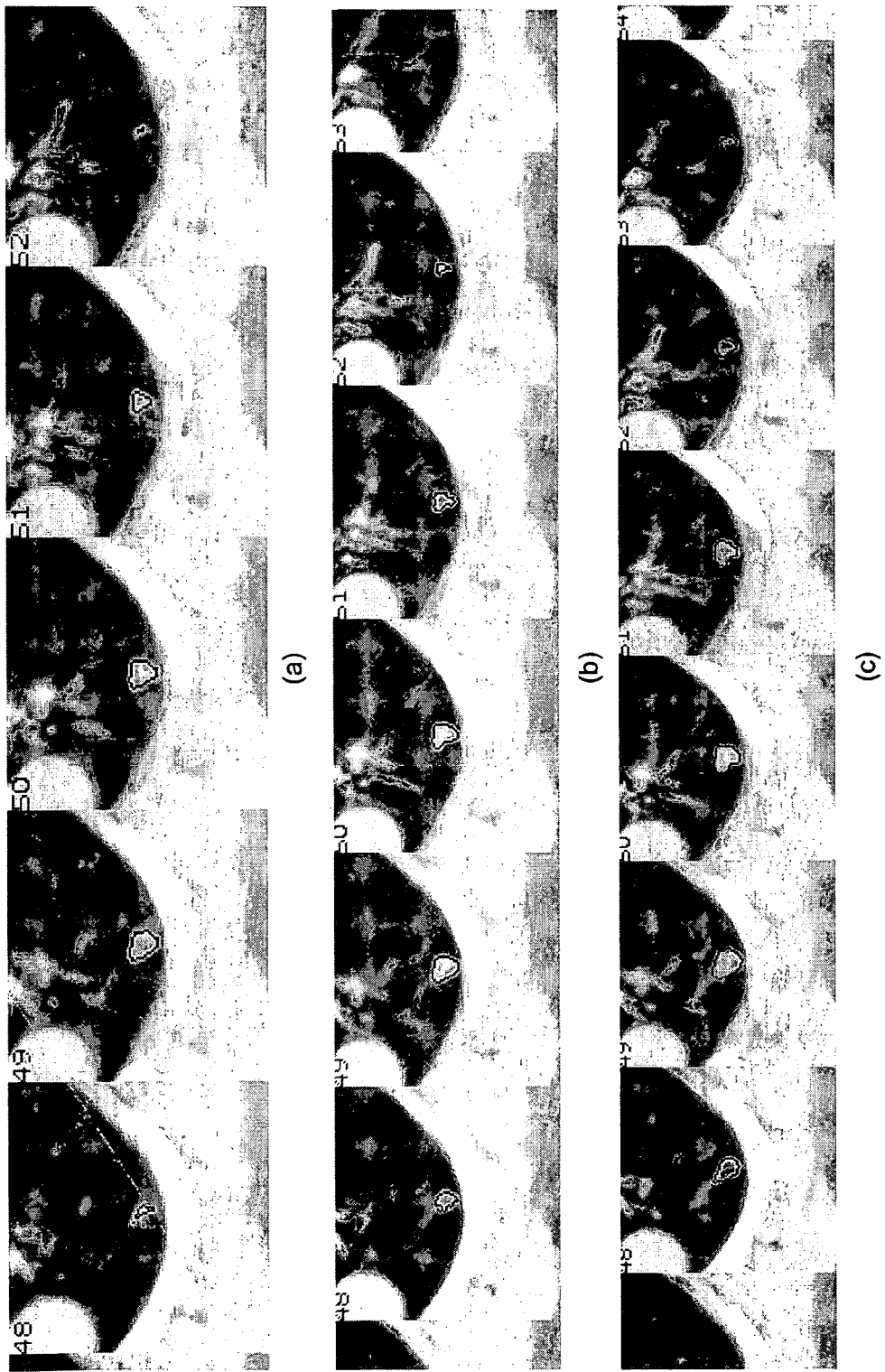
FIG. 27a to 27c show comparative results on a near-wall nodule.

FIGS. 27a to 27c show comparative results on a near wall nodule using the same three techniques; for FIG. 27b, the threshold is 0.935.

Conclusion

The preferred embodiment uses a new region growing method. This method uses a combination of distance and intensity information as the growing mechanism and peripheral contrast as the stop criterion. After comprehensive tests with synthetic images and real images it was found that this region growing method can provide very good results for isolated or pulmonary nodules in CT lung images, especially when it is combined with a fuzzy map. It can be used to detect isolated or pulmonary lung nodules semi-automatically.

Alternative Embodiments

The embodiments above are described by way of example, and are not intended to limit the scope of the invention. Various alternatives may be envisaged which nevertheless fall within the scope of the claims. As will be apparent from the above discussion, the method can be performed on a 2D image consisting of a single CT slice, or a 3D image consisting of consecutive CT slices.

What is claimed is:

1. A computed tomography (CT) method comprising:
receiving CT scan image data representative of a portion of a body and an indication of a seed point within a nodule in a CT scan image of the portion of the body;
performing by computation using a computing device fine segmentation based on local contrast of the CT scan image, to separate foreground areas from background areas of the CT scan image;
defining by computation from the CT scan image a mask including an object containing the seed point, connected foreground area, and background area surrounding the object, and excluding other foreground objects;
computing the connectivity of points of the CT scan image to the seed point; and
applying by computation a selective criterion to the connectivity of the points of the CT scan image to determine the extent of the nodule in the CT scan image, wherein the mask limits the determined extent of the nodule in the CT scan image.

2. The method of claim 1, wherein the connectivity is determined only on the basis of points within the mask.

3. The method of claim 1, wherein the fine segmentation applies a threshold based on the local contrast to identify a point as belonging to a foreground area.

4. The method of claim 3, wherein the local contrast is determined only within a local mask surrounding the point.

5. The method of claim 4, wherein the threshold is set as a mean of centroids of local intensity values above and below the threshold, offset by a predetermined value.

6. The method of claim 4, wherein the CT scan image is three-dimensional and the local mask is three-dimensional.

7. The method of claim 1, wherein the fine segmentation includes redefining an area of background enclosed by a foreground area as foreground.

8. The method of claim 7, including fitting a shape to the foreground area, and setting an interior of the shape as foreground.

9. The method of claim 1, wherein the connected foreground area is determined by performing region growing of the foreground area including the seed point.

10. The method of claim 9, wherein the CT scan image is three-dimensional and the region growing is performed in three dimensions to obtain the connected foreground area.

11. The method of claim 10, wherein the three-dimensional region growing is performed by identifying foreground areas in adjacent slices of the CT scan image connected to a foreground area containing the seed point.

12. The method of claim 11, wherein the foreground areas in adjacent slices are detected by displacing the seed point to adjacent slices of the CT scan image, and region growing from the displaced seed point if the displaced seed point is within a foreground area.

13. The method of claim 12, wherein the displaced seed point has a position within the slice corresponding to the centre of the connected foreground area in the slice from which the seed point was displaced.

14. The method of claim 9, wherein the mask is defined by expanding the connected foreground area to include the background area surrounding the connected foreground area and to exclude other foreground areas not connected to the connected foreground area.

15. The method of claim 14, wherein the mask is expanded so as to contain a predetermined proportion of the background area to the connected foreground area.

16. The method of claim 15, wherein the mask contains approximately equal foreground and background areas.

17. The method of claim 1, wherein the seed point is determined by receiving an indication of an initial seed point, and iteratively determining the mask based on a current seed point and selecting a point within a current connected foreground area as a new seed point, until masks determined by successive iterations converge.

18. The method of claim 17, wherein a point of high intensity within the connected foreground area is selected as the new seed point.

19. The method of claim 17, wherein a central point within the connected foreground area is selected as the new seed point.

20. The method of claim 17, wherein the initial seed point is selected by a user.

21. The method of claim 1, wherein the selective criterion includes performing region growing on a map of the connectivity.

22. The method of claim 21, wherein the region growing comprises growing a region within the connectivity map, finding the maximum boundary contrast during the region growing, and identifying the region corresponding to the maximum boundary contrast as defining the extent of the nodule.

23. The method of claim 21, wherein the region growing is performed by selecting a point on a boundary of a region based on a priority factor.

24. The method of claim 23, wherein the priority factor is based on the connectivity of the point, such that points of higher connectivity have a higher priority factor.

25. The method of claim 23, wherein the priority factor is based on the distance of the point from the centre of the region, such that points closer to the centre of the region have a higher priority factor.

26. The method of claim 1, wherein the connectivity is based on an affinity between adjacent points.

27. The method of claim 26, wherein the connectivity is based on the affinities of points along a path between a point and the seed point.

28. The method of claim 27, wherein the connectivity is based on the weakest affinity between adjacent points along the path.

29. The method of claim 28, wherein the connectivity is based on the path of strongest affinity between a point and the seed point.

30. The method of claim 26, wherein the affinity is a function of statistical variation of intensity around the seed point.

31. The method of claim 30, wherein the statistical variation includes the mean and standard deviation of intensity and gradient.

32. The method of claim 30, wherein the affinity is a function of statistical variation of intensity within the mask.

33. The method of claim 32, wherein the standard deviation is adjusted as a function of statistical variation in the background area within the mask, such that the background area has minimal but finite connectivity with the seed point.

34. The method of claim 1, wherein the selective criterion comprises a connectivity threshold.

35. The method of claim 1, including outputting an indication of the extent of the nodule.

36. A computed tomography (CT) method, comprising:
 (a) receiving CT scan image data representative of a portion of a body and an indication of a seed point within a nodule in a CT scan image of the portion of the body;
 (b) performing by computation using a computing device fine segmentation to separate the CT scan image around the seed point into foreground and background, using a threshold based on local contrast of the CT scan image;
 (c) setting background points enclosed by foreground points as foreground points;
 (d) growing by computation a foreground region containing the seed Point;
 (e) expanding by computation the foreground region to include background points while excluding foreground points not included within the foreground region, to create a mask;
 (f) setting a point within the centre of the foreground region and having a high intensity as a new seed point;
 (g) repeating steps (b) to (f) with the new seed point until the masks from successive iterations converge;
 (h) deriving by computation a fuzzy connectivity map defining the connectivity of points within the mask to the seed point; and
 (i) determining the extent of the nodule from the fuzzy connectivity map.

37. The method of claim 36, wherein (i) comprises growing by computation a connectivity region from the seed point within the fuzzy connectivity map, and outputting the region having the highest boundary contrast as the extent of the nodule.

38. A computer-readable medium having instructions stored thereon that, if executed by a computing device, cause the computing device to perform a computed tomography (CT) method, the method comprising:

receiving CT scan image data representative of portion of a body and an indication of a seed point within a nodule of a CT scan image of the portion of the body;

performing fine segmentation based on local contrast of CT scan image, to separate foreground areas from background areas of the CT scan image;

defining from the CT scan image a mask including an object containing the seed point, connected foreground area, and background area surrounding the object, and excluding other foreground objects;

computing the connectivity of points of the CT scan image to the seed point; and applying a selective criterion to the connectivity of the points to identify an extent of the nodule, wherein the mask limits the extent of the nodule in the CT scan image.

39. A computer-readable medium having instructions stored thereon that, if executed by a computing device, cause the computing device to perform a computed tomography (CT) method, the method comprising:

(a) receiving CT scan image data representative of a portion of a body and an indication of a seed point within a nodule of a CT scan image of the portion of the body;

(b) performing fine segmentation to separate the CT scan image around the seed point into foreground and background, using a threshold based on the local contrast;

(c) setting background points enclosed by foreground points as foreground points;

(d) growing a foreground region containing the seed point;

(e) expanding the foreground region to include background points while excluding foreground points not included within the foreground region, to create a mask;

(f) setting a point within the foreground region and having a high intensity as a new seed point;

(g) repeating steps (b) to (f) with the new seed point until the masks from successive iterations converge;

(h) deriving a fuzzy connectivity map defining the connectivity of points within the mask to the seed point; and (i) determining an extent of the nodule from the fuzzy connectivity map.

40. A computed tomography (CT) method comprising:

receiving CT scan image data representative of a portion of a body and an indication of a seed point within a nodule in a CT scan image of the portion of the body;

performing by computation using a computing device fine segmentation to separate foreground areas from background areas of the CT scan image;

defining by computation a mask including an object containing the seed point, connected foreground area, and background area surrounding the object, and excluding other foreground objects, wherein the foreground area is determined by performing region growing of the foreground area including the seed point, wherein the CT scan image is three-dimensional and the region growing is performed in three dimensions to obtain the connected foreground area, and wherein the region growing is performed by identifying foreground areas in adjacent slices of the scan image connected to a foreground area containing the seed point;

computing the connectivity of points of the image to the seed point; and applying by computing a selective criterion to the connectivity of the points to identify the extent of the nodule.

41. The method of claim 40, wherein the foreground areas in adjacent slices are detected by displacing the seed point to adjacent slices of the CT scan image, and region growing from the displaced seed point if the displaced seed point is within a foreground area.

42. The method of claim 41, wherein the displaced seed point has a position within the slice corresponding to the centre of the connected foreground area in the slice from which the seed point was displaced.

43. A computed tomography (CT) method comprising:

receiving CT scan image data representative of a portion of a body and an indication of a seed point within a nodule in a CT scan image of the portion of the body;

performing by computation using a computing device fine segmentation to separate foreground areas from background areas of the CT scan image;

defining by computation a mask including an object containing the seed point, connected foreground area, and the background area surrounding the object, and excluding other foreground objects, wherein the connected foreground area is determined by performing region growing of the foreground area including the seed point, wherein the mask is defined by expanding the connected foreground area to include the background area surrounding the connected foreground area and to exclude other foreground area not connected to the connected foreground area, and wherein the mask is expanded so as to contain a predetermined proportion of the background area to the connected foreground;

computing the connectivity of points of CT scan the image to the seed point; and applying by computation a selective criterion to the connectivity of the points to identify the extent of the nodule.

44. The method of claim 43, wherein the mask contains approximately equal foreground and background areas.

45. A computed tomography (CT) method comprising:

receiving CT scan image data representative of a portion of a body and an indication of a seed point within a nodule in a CT scan image of the portion of the body;

defining by computation using a computing device a mask including an object containing the seed point, connected foreground area, and background area surrounding the object, and excluding other foreground objects, wherein the seed point is determined by receiving an indication of an initial seed point, and iteratively determining the mask based on a current seed point and selecting a point of high intensity within a current connected foreground area as a new seed point, until masks determined by successive iterations converge;

computing the connectivity of points of the CT scan image to the seed point; and applying by computation a selective criterion to the connectivity of the points to identify the extent of the nodule.

46. The method of claim 45, wherein a point of high intensity within the connected foreground area is selected as the new seed point.

47. The method of claim 45, wherein a central point within the connected foreground area is selected as the new seed point.

48. The method of claim 45, wherein the initial seed point is selected by a user.

49. A computed tomography (CT) method comprising:

receiving CT scan image data representative of a portion of a body and an indication of a seed point within a nodule in a CT scan image of the portion of the body;

defining by computation using a computing device a mask including an object containing the seed point and background area surrounding the object, and excluding other foreground objects;

computing the connectivity of points of the CT scan image to the seed point; and applying by computation a selective criterion to the connectivity of the points to identify the extent of the nodule, wherein the selective criterion includes performing region growing on a map of the connectivity, and wherein the region growing comprises growing a region within the connectivity map, finding the maximum boundary contrast during the region growing, and identifying the region corresponding to the maximum boundary contrast as defining the extent of the nodule.

50. A computed tomography (CT) method comprising:

receiving CT scan image data representative of a portion of a body and an indication of a seed point within a nodule in a CT scan image of the portion of the body;

defining by computation using a computing device a mask including an object containing the seed point and background area surrounding the object, and excluding other foreground objects;

computing the connectivity of points of the CT scan image to the seed point; and applying by computation a selective criterion to the connectivity of the points to identify the extent of the nodule, wherein the selective criterion includes performing region growing on a map of the connectivity, and wherein the region growing is performed by selecting a point on a boundary of a region based on a priority factor.

51. The method of claim 50, wherein the priority factor is based on the connectivity of the point, such that points of higher connectivity have a higher priority factor.

52. The method of claim 50, wherein the priority factor is based on the distance of the point from the centre of the region, such that points closer to the centre of the region have a higher priority factor.

53. A computed tomography (CT) method comprising:

receiving CT scan image data representative of a portion of a body and an indication of a seed point within a nodule in a CT scan image of the portion of the body;

computing using a computing device the connectivity of points of the image to the seed point, wherein the connectivity is based on an affinity between adjacent points, the affinities of points along a path between a point and the seed point, the weakest affinity between adjacent points along the path, and the path of strongest affinity between a point and the seed point; and applying by computation a selective criterion to the connectivity of the points to identify the extent of the nodule.

54. A computed tomography (CT) method comprising:

receiving CT scan image data representative of a portion of a body and an indication of a seed point within a nodule in a CT scan image of the portion of the body;

computing using a computing device the connectivity of points of the CT scan image to the seed point, wherein the connectivity is based on an affinity between adjacent points, wherein the affinity is a function of statistical variation of intensity around the seed point, and wherein the statistical variation includes the mean and standard deviation of intensity and gradient; and applying by computation a selective criterion to the connectivity of the points to identify the extent of the nodule.

55. A computed tomography (CT) method comprising:

receiving CT scan image data representative of a portion of a body and an indication of a seed point within a nodule in a CT scan image of the portion of the body;

computing using a computing device the connectivity the connectivity of points of the image to the seed point, wherein the connectivity is based on an affinity between adjacent points, wherein the affinity is a function of statistical variation of intensity around the seed point, and wherein the affinity is a function of statistical variation of intensity within the mask; and applying by computation a selective criterion to the connectivity of the points to identify the extent of the nodule.

56. The method of claim 55, wherein the standard deviation is adjusted as a function of statistical variation in the background area within the mask, such that the background area has minimal but finite connectivity with the seed point.

* * * * *

UNITED STATES PATENT AND TRADEMARK OFFICE
CERTIFICATE OF CORRECTION

PATENT NO. : 7,574,031 B2  Page 1 of 1
APPLICATION NO. : 10/868890
DATED : August 11, 2009
INVENTOR(S) : Jamshid Dehmeshki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1371 days.

Signed and Sealed this

Seventh Day of September, 2010

David J. Kappos
*Director of the United States Patent and Trademark Office*